(12) United States Patent
Hecht et al.

(10) Patent No.: US 12,736,744 B2
(45) Date of Patent: Sep. 15, 2026

(54) LIGHT-DRIVEN NANODRONES

(71) Applicant: JULIUS-MAXIMILIANS-UNIVERSITÄT WÜRZBURG, Würzburg (DE)

(72) Inventors: Bert Hecht, Zell am Main (DE); Xiaofei Wu, Gerbrunn (DE); Raphael Ehehalt, Birkenfeld (DE)

(73) Assignee: JULIUS-MAXIMILIANS-UNIVERSITÄT WÜRZBURG, Würzburg (DE)

( * ) Notice: Subject to any disclaimer, the term of this patent is extended or adjusted under 35 U.S.C. 154(b) by 185 days.

(21) Appl. No.: 18/713,404

(22) PCT Filed: Nov. 22, 2022

(86) PCT No.: PCT/EP2022/082774
§ 371 (c)(1),
(2) Date: May 24, 2024

(87) PCT Pub. No.: WO2023/094369
PCT Pub. Date: Jun. 1, 2023

(65) Prior Publication Data

US 2025/0012969 A1 Jan. 9, 2025

(30) Foreign Application Priority Data

Nov. 25, 2021 (EP) .................................... 21210527

(51) Int. Cl.
*G02B 6/10* (2006.01)
*B82Y 15/00* (2011.01)
(Continued)

(52) U.S. Cl.
CPC .............. *G02B 6/105* (2013.01); *B82Y 15/00* (2013.01); *B82Y 20/00* (2013.01); *G02B 5/008* (2013.01); *G02B 6/107* (2013.01)

(58) Field of Classification Search
None
See application file for complete search history.

(56) References Cited

U.S. PATENT DOCUMENTS

| | | | | |
|---|---|---|---|---|
| 2015/0309218 | A1* | 10/2015 | Shalaev | G02B 5/008 359/241 |
| 2021/0159400 | A1* | 5/2021 | Radovanovic | G02B 5/008 |
| 2023/0027067 | A1* | 1/2023 | Liu | G02F 1/292 |

OTHER PUBLICATIONS

International Search Report and Written Opinion in Application No. PCT/EP2022/082774 dated Mar. 15, 2023, 10 pages.

(Continued)

*Primary Examiner* — Jerry Rahll
(74) *Attorney, Agent, or Firm* — Barclay Damon LLP

(57) ABSTRACT

The present invention relates to a nanodrone, a method of operating a nanodrone, and a system for operating a nanodrone. The nanodrone comprises a substrate extending perpendicular to a normal direction and two or more nanoantennas arranged on and/or in the substrate. Each of the two or more nanoantennas exhibits an optically addressable resonance at a respective resonance wavelength. The two or more nanoantennas comprise a first nanoantenna and a second nanoantenna, each being configured to scatter circularly polarized light at the respective resonance wavelength that is incident on the nanoantenna along the normal direction such that photons of the scattered light have a mean wavevector (I) and (II) in a plane perpendicular to the normal direction for left- and right-circularly polarized light, respectively, with i=1 for the first nanoantenna and i=2 for the second nanoantenna. The mean wavevector (III) with $j_i$=L or R is non-zero. The mean wavevector (IV) with (V) for $j_i$=R and (VI) for $j_i$=L is substantially zero or substantially anti-parallel to (III). At least one of (VII) and (VIII) is substantially parallel or substantially anti-parallel to one of (IX) and (X).

20 Claims, 8 Drawing Sheets

Figures 1A, 1B, 1C, 1D, 2A, 2B:
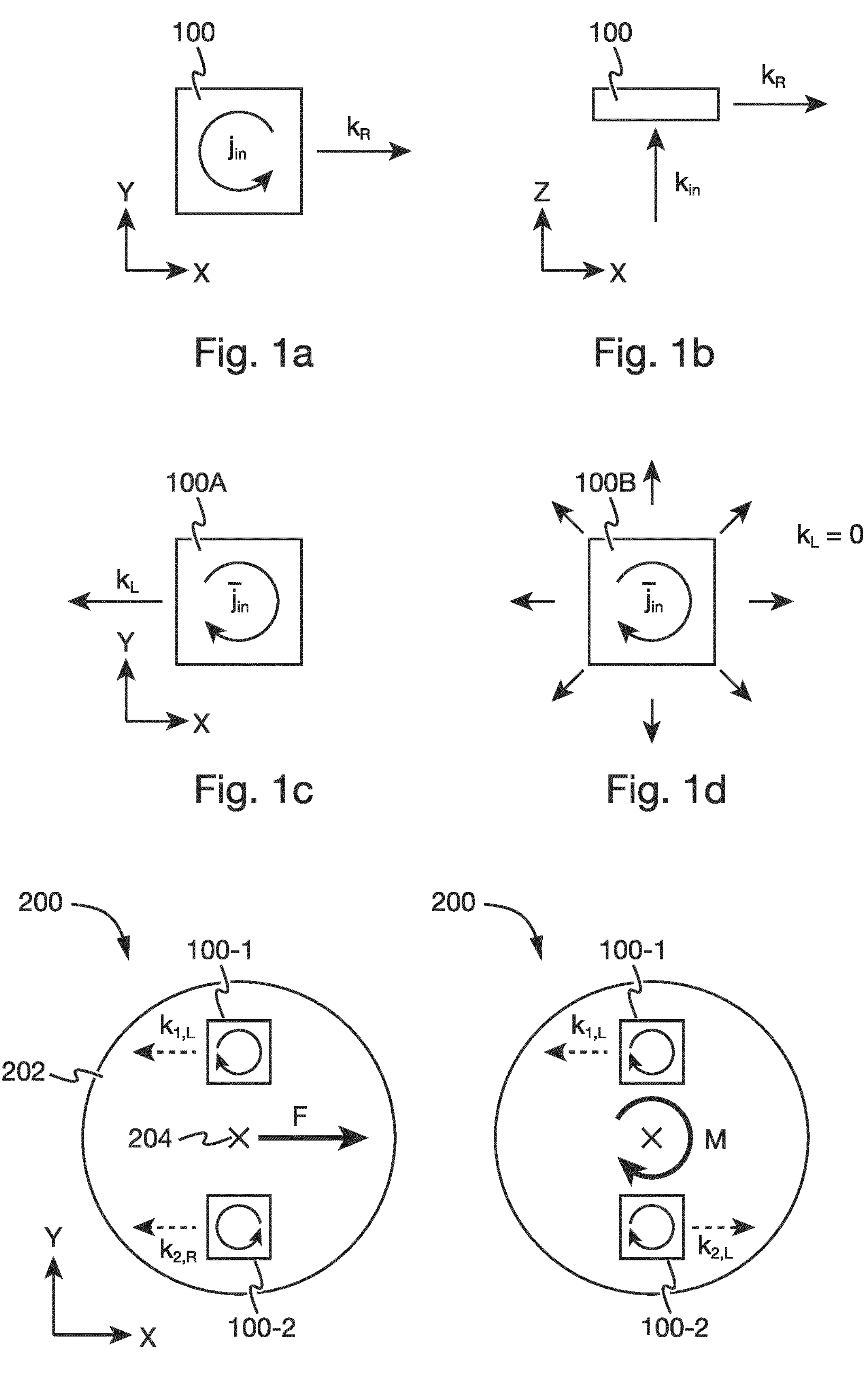

(51) Int. Cl.
*B82Y 20/00* (2011.01)
*G02B 5/00* (2006.01)

(56) References Cited

OTHER PUBLICATIONS

Ameen et al., "Infrared phononic nanoantennas: Localized surface phonon polaritons in SiC disks," Chinese Science Bulletin, vol. 55, No. 24, pp. 2625-2628 (2010), 4 pages.
Andren et al., "Microscopic metavehicles powered and steered by embedded optical metasurfaces," Nat Nanotech 16, pp. 970-974 (2021), 22 pages.
Bunea et al., "Light-powered microrobots: Challenges and Opportunities for Hard and Soft Responsive Microswimmers," Advanced Intelligent Systems 3:2000256 (2021), 21 pages.
Liaw et al., "Rotating Au nanorod and nanowire driven by circularly polarized light," Optics Express 22 (21):26005-26015 (2014), 11 pages.
Liaw et al., "Spinning gold nanoparticles driven by circularly polarized light," Journal of Quantitative Spectroscopy & Radiative Transfer, vol. 175, pp. 46-53 (2016), 8 pages.
Milekhin et al., "Nanoantenna structures for the detection of phonons in nanocrystals," Beilstein Journal of Nanotechnology 9:2646-2656 (2018), 11 pages.
Schuller et al., "Optical antenna thermal emitters," Nature Photonics, vol. 3, No. 11, pp. 658-661 (2009), 4 pages.
Tanaka et al., "Plasmonic linear nanomotor using lateral optical forces," Science Advances 6:eabc3726 (2020), 6 pages.
Wang et al., "Phonon-Polaritonic Bowtie Nanoantennas: Controlling Infrared Thermal Radiation at the Nanoscale," ACS Photonics, vol. 4, No. 7, pp. 1753-1760 (2017), 8 pages.
Yifat et al., "Reactive optical matter: light-induced motility in electrodynamically asymmetric nanoscale scatterers," Light: Science & Applications 7:105, DOI: 10.1038/s41377-018-0105-y (2018), 7 pages.
Ashkin, A., "Acceleration and Trapping of Particles by Radiation Pressure," Phys. Rev. Lett., vol. 24, No. 4, pp. 156-159 (1970), 4 pages.
Ashkin, A., "Atomic-Beam Deflection by Resonance-Radiation Pressure," Phys. Rev. Lett., vol. 25, No. 19, pp. 1321-1324 (1970), 4 pages.
Ashkin, A., "Applications of Laser Radiation Pressure," Science, vol. 210, No. 4474, pp. 1081-1088 (1980), 8 pages.
Aspelmeyer et al., "Cavity Optomechanics," Rev. Modern Phys., vol. 86, No. 4, pp. 1391-1452 (Oct.-Dec. 2014), 62 pages.
Beth, R., "Mechanical Detection and Measurement of the Angular Momentum of Light," Phys. Rev., vol. 50, pp. 115-125 (1936), 13 pages.
Búzás et al., "Light Sailboats: Laser driven autonomous microrobots," Appl. Phys. Lett. 101:041111 (2012), 5 pages.
Castillo et al., "Stabilization of a Mini Rotocraft with Four Rotors," IEEE Control Systems Magazine (Dec. 2005), pp. 45-55, 11 pages.
Cohen et al., "Suppressing Brownian motion of individual biomolecules in solution," PNAS 103(12):4362-4365 (2006), 4 pages.
Cohen-Tannoudji, C., "Manipulating Atoms with Photons," Physica Scripta., vol. 176:33-40 (1998), 8 pages.
Friese et al., "Optical alignment and spinning of laser-trapped microscopic particles," Nature, vol. 394, pp. 348-350 (with Errata in vol. 395, p. 621) (1998), 4 pages.
Friese et al., "Optically driven micromachine elements," Appl. Phys. Lett., vol. 78, No. 4, pp. 547-549 (2001), 3 pages.
Galajda et al., "Orientation of flat particles in optical tweezers by linearly polarized light," Optics Express, vol. 11, No. 5, pp. 446-451 (2003), 6 pages.
He et al., "Direct Observation of Transfer of Angular Momentum to Absorptive Particles from a Laser Beam with a Phase Singularity," Phys. Rev. Lett., vol. 75, No. 5, pp. 826-829 (1995), 6 pages.
Hoffman et al., "Quadrotor Helicopter Flight Dynamics and Control: Theory and Experiment," AIAA Guidance, Navigation and Control Conf. & Exhibit, Aug. 20-23, 2007, Hilton Head, SC, American Inst. of Aeronautics and Astronautics (2007), 20 pages.
Ilic et al., "Nanophotonic Heterostructures for Efficient Propulsion and Radiative Cooling of Relativistic Light Sails," Nano Letters 18:5583-5589 (2018), 7 pages.
Kawata et al., "Optically driven Mie particles in an evanescent field along a channeled waveguide," Optics Letters 21 (21):1768-1770 (1996), 3 pages.
Lehmuskero et al., "Ultrafast Spinning of Gold Nanoparticles in Water Using Circularly Polarized Light," Nano Letters 13:3129-3134 (2013), 6 pages.
Lehmuskero et al., "Plasmonic particles set into fast orbital motion by an optical vortex beam," Optics Express 22(4):4349-4356 (2014), 8 pages.
Liu et al., "Light-driven nanoscale plasmonic motors," Nature Nanotechnology Letters, vol. 5, pp. 570-573 (2010), 4 pages.
Lu et al., "Thermopile detector of light ellipticity," Nature Communications 7:12994 (2016), 6 pages.
Maragò et al., "Optical trapping and manipulation of nanostructures," Nature Nanotechnology, vol. 8, pp. 807-819 (2013), 13 pages.
Ozin et al., "Dream Nanomachines," Advanced Materials 17:3011-3018 (2005), 8 pages.
Phillips et al., "An optically actuated surface scanning probe," Optics Express 20(28):29679-29693 (2012), 15 pages.
Phillips et al., "Force sensing with a shaped dielectric micro-tool," EPL Journal 99:58004 (2012), 6 pages.
Pollard et al., "Optically trapped probes with nanometerscale tips for femto-newton force measurement," New Journal of Physics 12:113056 (2010), 15 pages.
Rodrigo et al., "Actuation of microfabricated tools using multiple GPC-based counterpropagating-beam traps," Optics Express 13(18):6899-6904 (2005), 6 pages.
Rodríguez-Fortño et al., "Lateral forces on circularly polarizable particles near a surface," Nature Communications 6:8799 (2015), 8 pages.
Shao et al., "Gold nanorod rotary motors driven by resonant light scattering," ACS Nano 9(12):12542-12551 (2015), 10 pages.
Šípová-Jungová et al., "Nanoscale Inorganic Motors Driven by Light: Principles, Realizations, and Opportunities," Chem. Rev. 120:269-287 (2020), 19 pages.
Song et al., "Optical recoil of asymmetric nano-optical antenna," Optics Express 19(16):14929-14936 (2011), 8 pages.
Tong et al., "Alignment, rotation, and spinning of single plasmonic nanoparticles and nanowires using polarization dependent optical forces," Nano Letters 10:268-273 (2010), 6 pages.
Wang et al., "Lateral Optical Force on chiral particles near a surface," Nature Communications 5:3307 (2014), 8 pages.
Wang et al., "The Encoding of Light-Driven Micro/Nanorobots: from single to swarming systems," Advanced Intelligent Systems 3:2000170 (2021), 18 pages.
Yan et al., "Optical vortex induced rotation of silver nanowires," J. Phys. Chem. Lett. 4:2937-2942 (2013), 6 pages.
Andren et al., "Microscopic metavehicles powered and steered by embedded optical metasurfaces," Nat Nanotech 16(9), pp. 970-974 (2021), 7 pages.

* cited by examiner

100
$k_R$
$j_{in}$
Y
X

100
$k_R$
Z
$k_{in}$
X

100A
$k_L$
$\bar{j}_{in}$
Y
X

100B
$k_L = 0$
$\bar{j}_{in}$ 200
100-1
202
$k_{1,L}$
204
F
$k_{2,R}$
Y
X
100-2

200
100-1
$k_{1,L}$
M
$k_{2,L}$
100-2

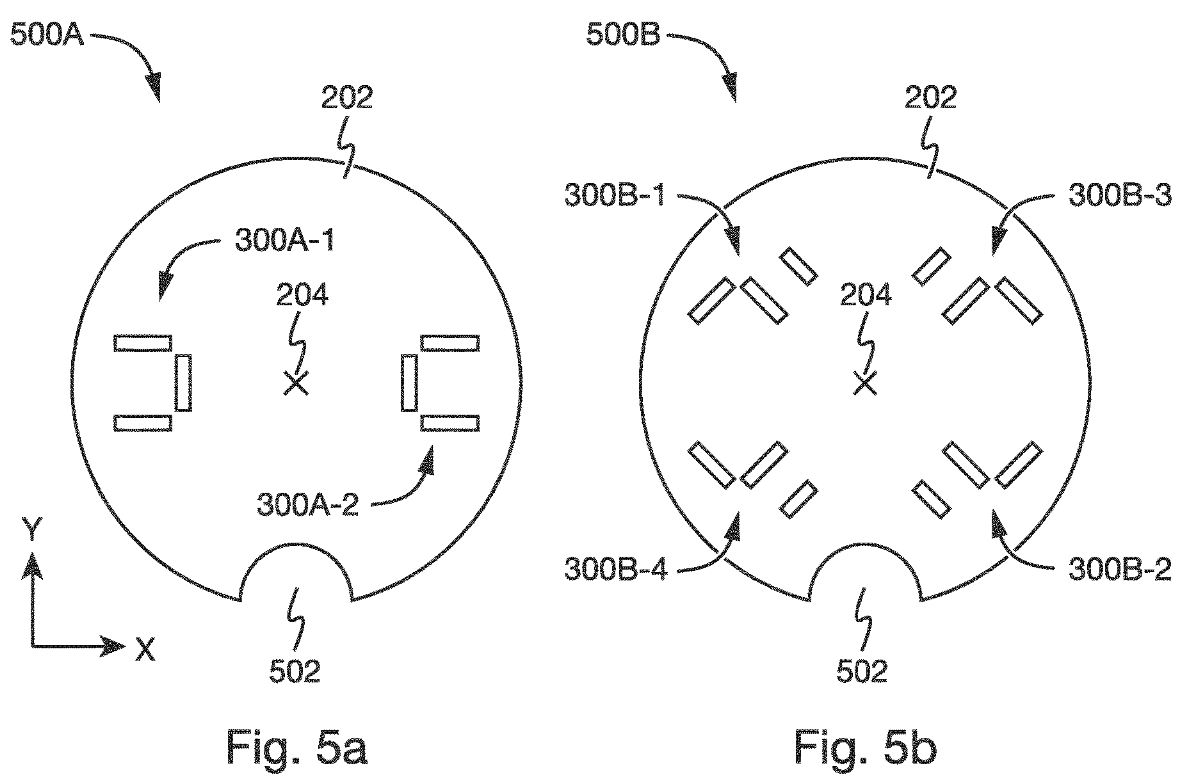
Fig. 5a
Fig. 5b
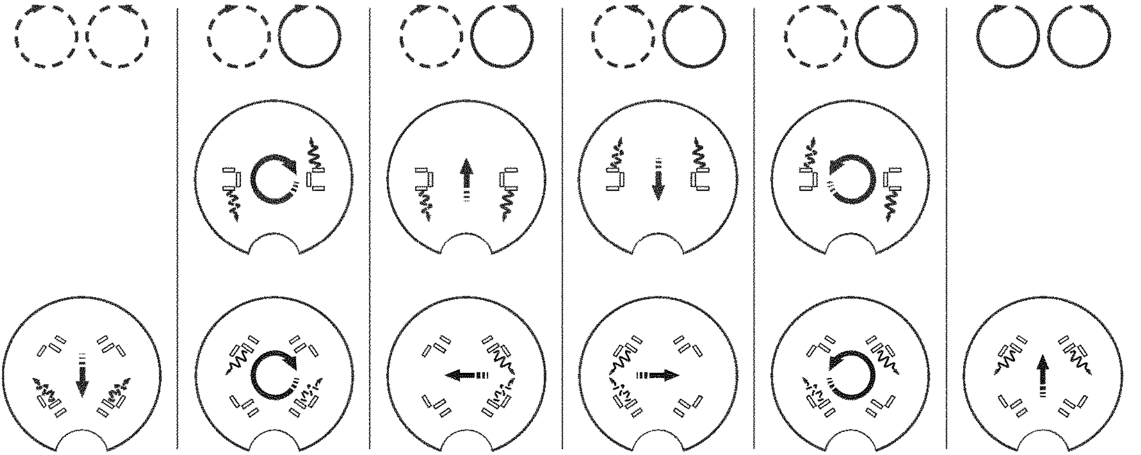
Fig. 6

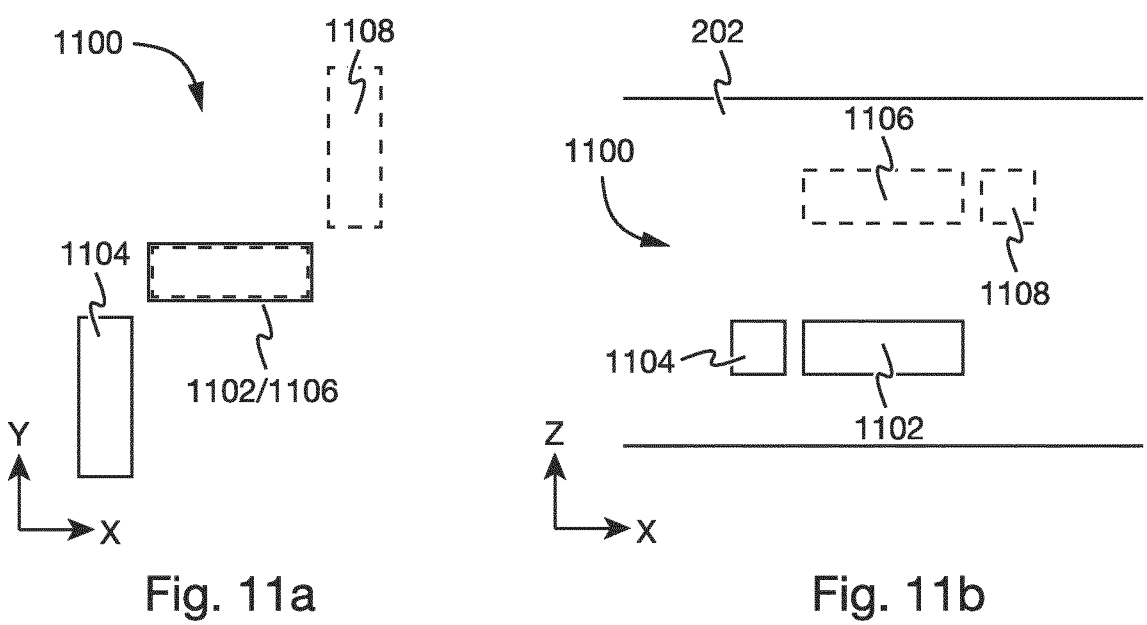
Fig. 11a
Fig. 11b
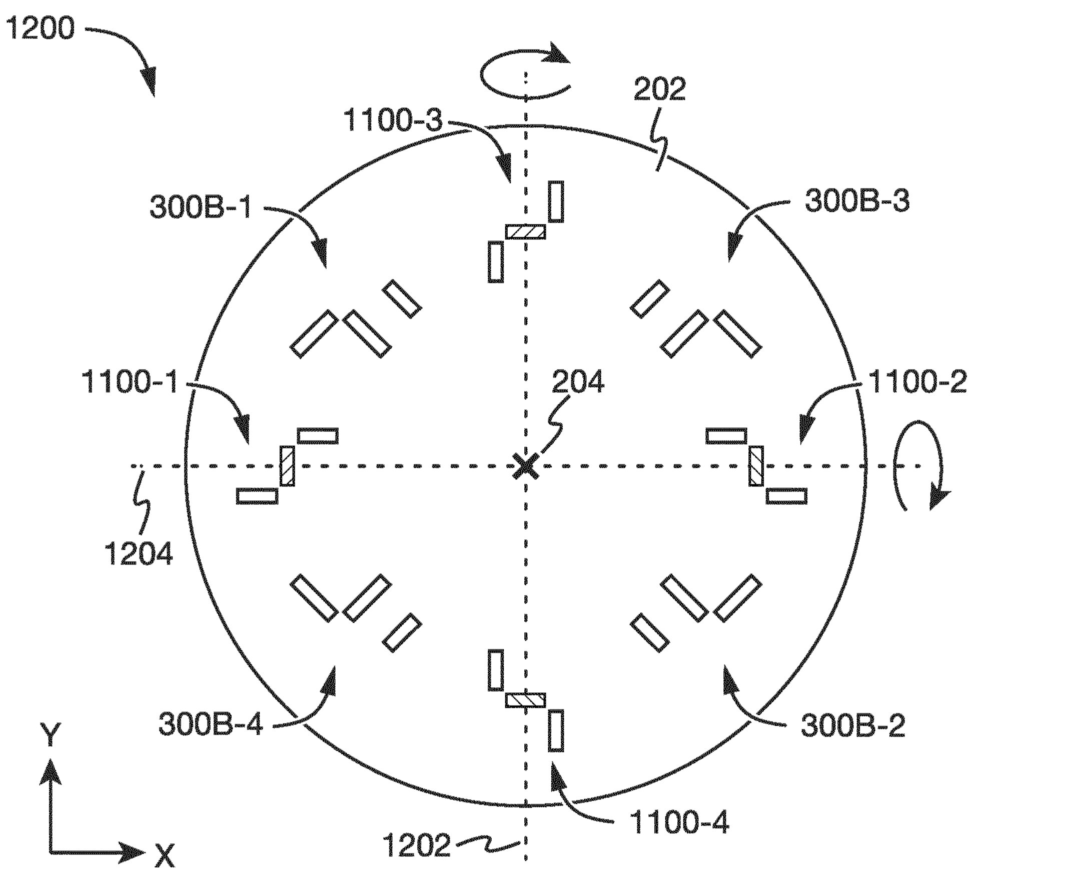
Fig. 12

LIGHT-DRIVEN NANODRONES

CROSS-REFERENCE TO RELATED APPLICATIONS

This application is the national phase entry of International Patent Application No. PCT/EP2022/082774, filed Nov. 22, 2022, and claims the benefit of European Patent Application No. 21210527.4, filed Nov. 25, 2021, the disclosures of which are incorporated herein by reference in their entirety.

FIELD OF THE INVENTION

The present invention is in the field of optomechanics. In particular, the invention relates to a nanodrone, a method of operating a nanodrone and a system for operating a nanodrone.

BACKGROUND

Light may be used to manipulate motional degrees of freedom of microscopic objects via light-induced forces. The latter may for example arise from a dispersive interaction between the electromagnetic field and a dipole moment induced in the object by the electromagnetic field and/or from a deflection of the light due to refraction at the object. This allows for the trapping of objects ranging from single atoms to biological cells in tightly focused laser beams, which are also known as optical tweezers or dipole traps. While such optical tweezers may also be used for performing a translation of the trapped object by moving the focus point of the laser beam, optical tweezers—due to their off-resonant nature—require very high light intensities to generate sufficiently strong potentials. This renders them unsuitable for many applications, in particular for those involving biological objects such as cells or other objects that absorb even only a tiny fraction of the light at the wavelength of the optical tweezers. Moreover, rotational degrees of freedom of the trapped objects can only be addressed under special circumstances, for example for objects having particular shapes such as objects with large handles that may be selectively trapped in multi-beam optical traps.

In addition to dispersive dipole forces, light may also exert forces on objects through the absorption or scattering of photons. Each photon carries a linear momentum, which is transferred to an object when the photon is absorbed or scattered by the object, thereby creating a radiation pressure acting on the object. This for example enables the generation of a directed longitudinal force via the absorption or scattering of a propagating laser beam. Scattering of photons has also been employed to generate lateral optical forces, e.g. using plasmonic nanoantennas having an asymmetric emission pattern for linearly polarized light as reported in Y. Y. Tanaka et al., *Science Advances* 6, eabc3726 (2020) or using an asymmetric diffraction grating as reported in D. Andrén et al., *Nat. Nanotech.* 16, 970-974 (2021).

However, the approaches proposed so far only provide limited control over some, but not all motional degrees of the manipulated object, for example because they only allow for a linear motion or rotation in a single fixed direction like the nanoantennas used in Y. Y. Tanaka et al. and/or because rotational and translational degrees of freedom are coupled as for the diffraction grating used in D. Andrén et al.

SUMMARY OF THE INVENTION

It is thus an object of the invention to provide means for independently controlling the motional degrees of freedom of a microscopic object using light.

This object is met by a nanodrone, a method of operating a nanodrone and a system for operating a nanodrone according to the independent claims. Embodiments of the present invention are detailed in the dependent claims.

The nanodrone according to the invention comprises a substrate that extends perpendicular to a normal direction as well as two or more nanoantennas. Each of the two or more nanoantennas is arranged on and/or in the substrate and exhibits an optically addressable resonance at a respective resonance wavelength. The two or more nanoantennas comprise at least a first nanoantenna and a second nanoantenna. Each of the first and second nanoantennas is configured to scatter circularly polarized light at the respective resonance wavelength that is incident on the nanoantenna along the normal direction. Photons of the scattered light have a mean wavevector $\vec{k}_{i,L}$ and $\vec{k}_{i,R}$ in a plane perpendicular to the normal direction for left- and right-circularly polarized light, respectively, with i=1 for the first nanoantenna and i=2 for the second nanoantenna. Each of the first and second nanoantennas is configured to scatter the light such that $\vec{k}_{i,j_i}$ with $j_i$=L or R is non-zero, while $\vec{k}_{i,\bar{j}_i}$, with $\vec{j}_i$=L for $j_i$=R and $\vec{j}_i$=R for $j_i$=L is substantially zero or substantially anti-parallel to $\vec{k}_{i,j_i}$. Furthermore, at least one of $\vec{k}_{1,L}$ and $\vec{k}_{1,R}$ is substantially parallel or substantially anti-parallel to one of $\vec{k}_{2,L}$ and $\vec{k}_{2,R}$.

In the present disclosure, a nanodrone may be any nanoscale or microscale object of which at least one motional degree of freedom can be controlled by light. The physical dimensions of the nanodrone, which may e.g. correspond to the physical dimensions of the substrate of the nanodrone, may for example range from 50 nm to 1 mm, in some embodiments from 200 nm to 100 μm.

The substrate may for example be a planar substrate having one or more flat surfaces, e.g. one or more flat surfaces that are perpendicular or substantially perpendicular to the normal direction. In other embodiments, some or all of the surfaces of the substrate may be curved, e.g. such that the respective surface also extends parallel to the normal direction. In the following, the normal direction may also be referred to as the Z direction, whereas the plane perpendicular to the normal direction may also be referred to as the XY plane. In some embodiments, the substrate is optically transparent at least in part, in particular at the resonance wavelengths of the two or more nanoantennas. The substrate may for example be optically transparent in the infrared, near-infrared, visible and/or ultraviolet spectrum at least in part. The substrate may for example comprise or consist of one or more optically transparent layers, wherein the two or more nanoantennas may for example be arranged on and/or in one of the optically transparent layers. Additionally or alternatively, the substrate may comprise or consist of one or more non-transparent layers, e.g. of one or more absorbing layers, wherein the two or more nanoantennas may for example be arranged on one of the nontransparent layers.

Each of the two or more nanoantennas is configured to resonantly scatter light at the respective resonance wavelength, i.e. a scattering cross-section of a given one of the two or more nanoantennas and thus a scattering rate of the light incident on this nanoantenna may exhibit a maximum at the respective resonance wavelength. The scattering may occur via any kind of resonant light-matter interaction. The nanoantennas may for example comprise or consist of a material that supports one or more polariton modes, i.e. modes arising from a coupling between light incident on the material and one or more excitations within the material such as a phonon mode, i.e. a collective excitation of atoms in the material, or a plasmon mode, i.e. a collective excitation of charge carriers such as electrons in the material. The excitation may be associated with an electric and/or magnetic multipole moment, to which the electromagnetic field of the light may couple. The excitation may for example be associated with an electric and/or magnetic dipole moment and/or with an electric and/or magnetic quadrupole moment. The coupling may be resonant at one or more resonance wavelengths, giving rise to a strong interaction between the light and the respective nanoantenna and thus an increased scattering cross-section and an increased scattering rate. Additionally or alternatively, the scattering may for example occur via Mie scattering. The resonance wavelength may be controlled by adjusting a physical dimension, a shape, an arrangement, and/or a material of the structures of the respective nanoantenna, e.g. such that the resonance wavelengths are in the infrared, near-infrared, visible and/or ultraviolet spectrum.

Each of the two or more nanoantennas may comprise one or more structures, which may for example be embedded in the substrate and/or arranged on a top surface and/or on a bottom surface of the substrate that extends perpendicular to the normal direction. Some or all of the structures may be electrically conductive, wherein the electrically conductive structures may for example comprise or consist of a metal such as gold, silver, aluminum, and/or copper. The electrically conductive structure may for example support one or more plasmon modes and/or one or more phonon modes. Additionally or alternatively, some or all of the structures may be semiconducting and/or dielectric structures. The dielectric structures may for example comprise or consist of a material having a different refractive index than adjacent portions of the substrate and may e.g. be configured to scatter the incident light via Mie scattering. In some embodiments, the dielectric structures may comprise or consist of a transparent material, in particular glass.

The two or more nanoantennas comprise at least the first nanoantenna and the second nanoantenna. In some embodiments, the two or more nanoantennas may comprise furthe antennas, e.g. a third and a fourth nanoantenna as detailed below. The two or more nanoantennas may in particular consist of an even number of nanoantennas, e.g. two, four, six or eight nanoantennas. In other embodiments, the two or more nanoantennas may consist of an odd number of nanoantennas, e.g. three nanoantennas, wherein two of the three nanoantennas may for example be used for moving the nanodrone forward and backward and the remaining nanoantenna may for example be used for rotating the nanodrone. Preferably, each of the two or more nanoantennas is arranged on a concentric circle around a center of the nanodrone, in particular a center of mass of the nanodrone.

Each of the first and second nanoantennas may be configured to scatter circularly polarized light at the respective resonance wavelength that is incident on the respective nanoantenna along the normal direction by absorbing and re-emitting photons. Absorption of a photon may e.g. create a phonon or a plasmon within the structures of the nanoantenna, which may subsequently decay by emitting another photon. Additionally or alternatively, the first and second nanoantennas may be configured to scatter the circularly polarized light at the respective resonance wavelength by Mie scattering. The resonant nature of the lightmatter interaction with the first and second nanoantennas may allow for selectively addressing the first nanoantenna and/or the second nanoantenna by choosing the wavelength of the incident light accordingly, e.g. such that it matches the respective resonance wavelength. Additionally or alternatively, individual nanoantennas may for example also be addressed selectively by an appropriate choice of the polarization of the incident light, e.g. as detailed below. There is thus no need to selectively direct the incident light at a particular nanoantenna, but the entire nanodrone may for example be illuminated homogeneously using unfocused light.

The first and second nanoantennas are configured to scatter the circularly polarized light asymmetrically for at least one circular polarization, e.g. such that a far-field scattering pattern of the scattered light is not rotationally symmetric about the normal direction. The mean wavevector of the photons of the scattered light in the plane perpendicular to the normal direction, i.e. the expectation value of the wavevector of a scattered photon projected onto the XY plane perpendicular to the normal or Z direction, is denoted as $\vec{k}_{i,j}$ in the following, wherein the index i=1, 2, . . . specifies the respective (first, second, . . . ) nanoantenna and the index j=L or R the polarization of the incident light, i.e. left- and right-circularly polarized light, respectively. In other words, the wavevector $\vec{k}_{i,j}$ is a two-component vector comprising the X and Y components of the three-dimensional mean wavevector of the scattered photons. A wavevector projected onto the XY plane perpendicular to the Z direction may also be referred to as an in-plane wavevector in the following. In the context of this disclosure, left- and right-circular polarization refer to the two opposite circular polarization states of an electromagnetic wave, which may also be referred to as clockwise and counterclockwise circular polarization, respectively.

The mean wavevector $\vec{k}_{i,j}$ of a given nanoantenna i for a given polarization j may for example be obtained by integrating the projection of the wavevector of a scattered photon onto the XY plane over the entire far-field scattering pattern of the nanoantenna, i.e. all scattering directions, when the nanoantenna is illuminated along the normal direction at this polarization, wherein the wavevector associated with each scattering direction is weighted with the intensity of the light scattered in this direction. The mean wavevector $\vec{k}_{i,j}$ may for example be defined as $$\vec{k}_{i,j} = \frac{1}{4\pi I_{in}} \int d\varphi d\theta \sin\theta \cdot I_{sc}(\theta, \varphi) \vec{k}_{xy}(\theta, \varphi)$$

wherein $I_{in}$ is the intensity of the light incident on the nanoantenna, θ and φ are the polar and azimuthal angle, respectively, $I_{sc}$ (θ, φ) is the intensity of the light scattered by the nanoantenna in the direction (θ, φ) and $$\vec{k}_{xy}(\theta, \varphi) = \frac{2\pi}{\tilde{\lambda}}(\sin\theta\cos\varphi, \sin\theta\sin\varphi)$$

is the in-plane wavevector of a photon with wavelength $\tilde{\lambda}$ scattered in the direction (θ, φ). The mean wavevector $\vec{k}_{i,j}$ and the wavelength $\tilde{\lambda}$ may refer to the respective quantities in the same medium, in particular the medium surrounding the nanodrone (i.e. such that the linear momentum $-\hbar\vec{k}_{i,j}$ corresponds to the linear momentum transferred to the nanodrone itself rather than to the total linear momentum transferred to the nanodrone and the surrounding medium).

Each of the first and second nanoantennas is configured to scatter the incident light such that the mean wavevector $\vec{k}_{i,j_i}$ is non-zero for at least one of left- and right circular polarized light incident along the normal direction. The wavevector $\vec{k}_{i,j_i}$ may be non-zero for the same circular polarization for the first and second nanoantennas ($j_1=j_2$), e.g. $\vec{k}_{1,L}$ and $\vec{k}_{2,L}$ may be non-zero, and/or may be non-zero for opposite circular polarizations for the first and second nanoantennas ($j_1\neq j_2$), e.g. $\vec{k}_{1,L}$ and $\vec{k}_{2,R}$ may be non-zero. In the context of this disclosure, a wavevector $\vec{k}_{i,j_i}$ may for example be considered to be non-zero if a magnitude of the mean wavevector $|\vec{k}_{i,j_i}|$ is at least 0.1%, in some examples at least 1%, preferably at least 10%, in one example at least 30% of the magnitude of the wavevector $|\vec{k}|=2\pi/\lambda$ of a photon of the respective wavelength $\lambda$ (in vacuum/air) and at least 20%, in some examples at least 10%, in one example at least 5% of the magnitude of the mean wavevector $|\vec{k}_{i,\bar{j}_i}|$ for the same nanoantenna at the opposite circular polarization $\bar{j}_i$=L for $j_i$=R and $\bar{j}_i$=R for $j_i$=L. In other words, the wavevector $\vec{k}_{i,j_i}$ may be considered to be non-zero if its relative magnitude compared to $|\vec{k}_{i,\bar{j}_i}|$ is sufficiently large so as to not be considered substantially zero based on the corresponding definition given below and its absolute magnitude $|\vec{k}_{i,j_i}|$ is at least a minimum fraction of $|\vec{k}|$.

The Z component of the mean wavevector of the scattered photons may be zero for one or both circular polarizations in some embodiments (e.g. such that only a light pressure generated by the incident light acts on the respective nanoantenna along the normal direction), but may be non-zero for one or both circular polarizations for some or all of the nanoantennas in other embodiments (e.g. such that the scattered/outgoing light generates a recoil along the normal direction in addition to the light pressure generated by the incident light and thus either enhances the light pressure or compensates the light pressure at least in part).

The asymmetric scattering of the incident light results in a recoil with a linear momentum $-\hbar\vec{k}_{i,j_i}$ being transferred to the nanodrone for each scattered/outgoing photon on average, thereby generating a directed force $\vec{F}_{i,j_i}\|-\vec{k}_{i,j_i}$ acting on the i-th nanoantenna and thus on the nanodrone (in addition to the light pressure generated by the incident light, i.e. the momentum $\hbar|\vec{k}|$ in the Z direction transferred by each incident photon). The in-plane force imparted on the i-th nanoantenna by the scattered light may for example be given by $$\vec{F}_{i,j_i} = N_{ph,i}\cdot\hbar\vec{k}_{i,j_i} = \frac{I_{in}\cdot A_{sc,i}}{c}\cdot\frac{\vec{k}_{i,j_i}}{|\vec{k}|}$$

wherein $N_{ph,i}$ is the rate of photons scattered by the i-th nanoantenna, $A_{sc,i}$ is the scattering cross-section of the i-th nanoantenna, c is the speed of light in vacuum and $\hbar$ is the reduced Planck constant. Each of the first and second nanoantennas may for example be configured to scatter circularly polarized light at the respective resonance wavelength that is incident on the nanoantenna along the normal direction such that a magnitude of the force $|\vec{F}_{i,j_i}|$ is between 1 fN/(mW/μm$^2$) and 10 pN/(mW/μm$^2$), in some examples between 10 fN/(mW/μm$^2$) and 1 pN/(mW/μm$^2$), in one example between 0.05 pN/(mW/μm$^2$) and 0.5 pN/(mW/μm$^2$). The scattering cross-sections of the first and second nanoantennas may for example be between $10^{-3}$ μm$^2$ and 10 μm$^2$, in some examples between $10^{-2}$ μm$^2$ and 1 μm$^2$, in one example between 0.05 μm$^2$ and 0.5 μm$^2$. A magnitude of the mean in-plane wavevector $\vec{k}_{i,j_i}$ may for example be between 1% and 99%, in some examples between 10% and 60%, in one example between 30% and 50% of the wavevector $|\vec{k}|=2\pi/\lambda$ of a photon of the respective (vacuum) wavelength $\lambda$.

Each of the first and second nanoantennas is further configured to scatter the incident light such that the mean wavevector $\vec{k}_{i,\bar{j}_i}$ for the opposite circular polarization $\bar{j}_i$=L for $j_i$=R and $\bar{j}_i$=R for $j_i$=L is either substantially zero or substantially anti-parallel to $\vec{k}_{i,j_i}$. In other words, each of the first and second nanoantennas exhibits a chiral response, wherein left-circularly polarized light is scattered differently than right-circularly polarized light. In particular, the response of the first and second nanoantennas is such that the force being transferred to the nanodrone may be switched off or reversed, respectively, by inverting the polarization of the incident light. In the context of this disclosure, a wavevector $\vec{k}_{i,\bar{j}_i}$ may for example be considered to be substantially zero if a magnitude of the mean wavevector $|\vec{k}_{i,\bar{j}_i}|$ is less than 20%, in some examples less than 10%, preferably less than 5% of the magnitude of the mean wavevector $|\vec{k}_{i,j_i}|$ for the same nanoantenna at the opposite circular polarization $j_i$. If the mean wavevector of the scattered photons is substantially zero, the scattered photons do not generate a net recoil and thus do not transfer a net momentum to the respective nanoantenna. In this case, only the light pressure generated by the incident photons, which is aligned with the normal direction, may act on the respective nanoantenna, i.e. only the momentum of the incident photons may be transferred to the respective nanoantenna. A wavevector $\vec{k}_{i,\bar{j}_i}$ may for example be considered to be substantially anti-parallel to $\vec{k}_{i,j_i}$ if both wavevectors are non-zero and an angle between the wavevectors is between 150° and 210°, in some examples between 160° and 200°, preferably between 170° and 190°, in one example between 175° and 185°.

The first and second nanoantennas are further configured to scatter the incident light such that at least one of $\vec{k}_{1,L}$ and $\vec{k}_{1,R}$ is substantially parallel or substantially anti-parallel to one of $\vec{k}_{2,L}$ and $\vec{k}_{2,R}$. In the context of this disclosure, a wavevector $\vec{k}_{1,j_i}$ may for example be considered to be substantially parallel to a wavevector $\vec{k}_{2,j_2}$ if both wavevectors are non-zero and an angle between the wavevectors is between −30° and 30°, in some examples between −20° and 20°, preferably between −10° and 10°, in one example between −5° and 5°. If one of $\vec{k}_{1,L}$ and $\vec{k}_{1,R}$ is substantially parallel to one of $\vec{k}_{2,L}$ and $\vec{k}_{2,R}$, the respective forces may add up and generate a directed combined force F acting on the nanodrone. Thereby, the nanodrone may be accelerated along the corresponding direction to induce a linear motion or translation of the nanodrone in one direction. If one of $\vec{k}_{1,L}$ and $\vec{k}_{1,R}$ is substantially anti-parallel to one of $\vec{k}_{2,L}$ and $\vec{k}_{2,\mathcal{R}}$, the respective forces may cancel at least in part and generate a torque $\vec{M}$ acting on the nanodrone that is substantially collinear with the normal direction, e.g. substantially parallel or substantially anti-parallel to the normal direction. Thereby, a rotation of the nanodrone may be induced around an axis parallel to the normal direction. If the forces are imbalanced or not cancelled completely, a combined rotation and translation of the nanodrone may be induced, e.g. such that the nanodrone moves along a circular path.

In this way, the present invention allows for controlling the fundamental motional degrees of freedom: translation and rotation. By combining pairs of nanoantennas, each of the motional degrees of freedom may be accessed, e.g. translation along one axis in 1D, translation along two axes and rotation about a perpendicular axis in 2D and translation along three axes as well as rotation about three axes in 3D. Furthermore, due to the polarization dependence of the transferred momentum, individual degrees of freedom may be controlled independently by adjusting the polarization. In some embodiments, the resonance wavelengths of some or all of the two or more nanoantennas may be different, which further allows for addressing individual nanoantennas independently based on a wavelength of the incident light. This may e.g. allow for independent control over all three degrees of freedom in 2D or all six degrees of freedom in 3D. Moreover, the nanodrone may be illuminated with unfocused light, e.g. a collimated beam of light, since individual nanoantennas may be addressed selectively by an appropriate choice of the polarization and/or the wavelength of the light rather than requiring light that is selectively focused onto the respective nanoantennas.

In a preferred embodiment, the first and second nanoantennas are configured to scatter the incident light such that a product of a scattering cross-section $A_{sc,1}$ of the first nanoantenna at the resonance wavelength of the first nanoantenna and a magnitude of the at least one of $\vec{k}_{1,\mathcal{L}}$ and $\vec{k}_{1,\mathcal{R}}$ that is substantially parallel or substantially anti-parallel to one of $\vec{k}_{2,\mathcal{L}}$ and $\vec{k}_{2,\mathcal{R}}$ is substantially equal to a product of a scattering cross-section $A_{sc,2}$ of the second nanoantenna at the resonance wavelength of the second nanoantenna and a magnitude of the respective one of $\vec{k}_{2,\mathcal{L}}$ and $\vec{k}_{2,\mathcal{R}}$. The two products may for example differ by less than 30%, in some examples by less than 20%, preferably by less than 10%, in one example by less than 5%. The scattering cross-sections $A_{sc,1}$ and $A_{sc,2}$ may for example be the scattering-cross sections of the respective nanoantenna at its resonance wavelength and at the polarization associated with the respective one of $\vec{k}_{1,\mathcal{L}}$ and $\vec{k}_{1,\mathcal{R}}$ or $\vec{k}_{2,\mathcal{L}}$ and $\vec{k}_{2,\mathcal{R}}$, respectively. In this way, forces of substantially equal magnitude acting on the first and second nanoantennas, respectively, may be generated with substantially equal intensities of the incident light at the resonance wavelengths of the first and second nanoantennas. This may for example allow for generating a torque, but no net force or a force, but no net torque acting on the nanodrone.

In some embodiments, the first and second nanoantennas are configured to scatter the incident light such that the magnitude of the at least one of $\vec{k}_{1,\mathcal{L}}$ and $\vec{k}_{1,\mathcal{R}}$ that is substantially parallel or substantially anti-parallel to one of $\vec{k}_{2,\mathcal{L}}$ and $\vec{k}_{2,\mathcal{R}}$ is substantially equal to the magnitude of the respective one of $\vec{k}_{2,\mathcal{L}}$ and $\vec{k}_{2,\mathcal{R}}$. For example, $\vec{k}_{1,\mathcal{L}}$ may be substantially parallel or substantially anti-parallel to $\vec{k}_{2,\mathcal{R}}$ and substantially equal in magnitude as $\vec{k}_{2,\mathcal{R}}$. In the context of this disclosure, two wavevectors may for example be considered as having an equal magnitude if the magnitudes of the two wavevectors differ by less than 30%, in some examples by less than 20%, preferably by less than 10%, in one example by less than 5%. Scattering the incident light such that the mean wavevectors associated with the first and second nanoantennas are substantially equal in magnitude may for example allow for generating a torque, but no net force (anti-parallel wavevectors of equal magnitude) or a force, but no net torque (parallel wavevectors of equal magnitude), e.g. if the scattering cross-sections of the first and second nanoantennas are also substantially equal. In other examples, the magnitudes of the respective wavevectors may be different, in which case a pure force or a pure torque may for example be generated by adjusting the intensities of the incident light at the resonance wavelengths of the first and second nanoantennas accordingly and/or by choosing appropriate scattering cross-sections for the first and second nanoantennas, i.e. such that the forces generated by the first and second nanoantennas are substantially equal in magnitude. The magnitude of the at least one of $\vec{k}_{1,\mathcal{L}}$ and $\vec{k}_{1,\mathcal{R}}$ that is substantially parallel or substantially anti-parallel to one of $\vec{k}_{2,\mathcal{L}}$ and $\vec{k}_{2,\mathcal{R}}$ may for example be at least 10%, in some examples at least 20%, preferably at least 50% of the magnitude of the respective one of $\vec{k}_{2,\mathcal{L}}$ and $\vec{k}_{2,\mathcal{R}}$.

Preferably, the scattering cross-section of the second nanoantenna is similar to the scattering cross-section of the first nanoantenna for left-circularly polarized light and/or for right-circularly polarized light. The scattering cross-section of the second nanoantenna may for example be between 30% and 300%, in some examples between 50% and 200% of the scattering cross-section of the first nanoantenna for one or both polarizations. In some embodiments, the scattering cross-sections of the first and second nanoantennas may be substantially equal for one or both polarizations, e.g. such that the scattering cross-sections of the nanoantennas differ by less than 30%, in some examples by less than 20%, preferably by less than 10%, in one example by less than 5%. In some embodiments, the scattering cross-sections of some or all of the two or more nanoantennas may be similar and/or substantially equal.

In some embodiments, for which the wavevector $\vec{k}_{i,\bar{j}_i}$ is substantially anti-parallel to the wavevector $\vec{k}_{i,j_i}$ for one or both of the first and second nanoantennas, the wavevector $\vec{k}_{i,\bar{j}_i}$ of the respective nanoantenna may be substantially equal in magnitude to the wavevector $\vec{k}_{i,\bar{j}_i}$ of the same nanoantenna. In other examples, the magnitude of the wavevector $\vec{k}_{i,\bar{j}_i}$ of the respective nanoantenna may be at least 10%, in some examples at least 20%, preferably at least 50% of the magnitude of the wavevector $\vec{k}_{i,j_i}$ of the same nanoantenna.

In some embodiments, $\vec{k}_{i,j_i}$, i.e. the non-zero mean wavevector, is substantially perpendicular to a connection vector $\vec{r}_{1,2}$ connecting a center of the first nanoantenna with a center of the second nanoantenna for each of the first and second nanoantennas, e.g. to maximize a torque acting on the nanodrone. A center of a nanoantenna may for example be a center of emission of the respective nanoantenna, i.e. the point from which the emitted light originates when approximating the nanoantenna as a point source. This may correspond to the point at which the force due to the photon recoil acts on the respective nanoantenna. Preferably, the center of the first nanoantenna and the center of the second nanoantenna are arranged symmetrically with respect to a center of the nanodrone, i.e. the center of the nanodrone is located half-way between the first and second nanoantennas. The center of the nanodrone may for example be a geometric center of the nanodrone or preferably a center of mass of the nanodrone. This may for example allow for rotating the nanodrone about its center of mass by anti-parallel scattering of light by the first and second nanoantennas. In a preferred embodiment, the first and second nanoantennas are arranged along a principle axis of the nanodrone, i.e. parallel to an eigenvector of the moment of inertia tensor of the nanodrone, and/or along a symmetry axis of the nanodrone.

The resonance wavelengths of some or all of the two or more nanoantennas may be equal, e.g. for addressing some or all of the two or more nanoantennas with a single light source. In other embodiments, the resonance wavelengths of some or all of the two or more nanoantennas may be different from the resonance wavelength of other nanoantennas, e.g. for addressing individual nanoantennas or subsets of nanoantennas with light of a particular wavelength. For example, a first subset of nanoantennas may have a first resonance wavelength and a second subset of nanoantennas may have a second resonance wavelength different from the first resonance wavelength. The resonance wavelengths of the first and second nanoantennas may be equal in some embodiments and may be different in other embodiments. The resonance wavelengths of two nanoantennas may for example be considered as equal if a scattering cross-section of a given one of the two nanoantennas and/or a scattering rate by this nanoantenna for circularly polarized light incident along the normal direction at the resonance wavelength of the other nanoantenna is at least 50%, in some examples at least 75%, preferably at least 90%, in one example at least 95% of the scattering cross-section and the scattering rate, respectively, at the resonance wavelength of the given nanoantenna and vice-versa. Otherwise, the resonance wavelengths of the two nanoantennas may be regarded as being different. The resonance wavelengths of the first and second nanoantennas may for example differ by more than 50 nm, preferably by more than 100 nm, in one example by more than 200 nm. In some embodiments, the difference between the resonance wavelengths of the first and second nanoantennas may be larger than a half width at half maximum of one or both of the resonances.

In a preferred embodiment, a magnitude of the intensity-normalized in-plane force $|\vec{F}_{1,j_1}|/I_{in}$ imparted on the first nanoantenna by the scattering of circularly polarized light incident along the normal direction at the resonance wavelength of the second nanoantenna is less than 20%, in some examples less than 10%, in one example less than 5% of the magnitude of the intensity-normalized in-plane force at the resonance wavelength of the first nanoantenna and/or vice-versa. For example, the scattering cross-section of the first nanoantenna and/or the scattering rate by the first nanoantenna for circularly polarized light incident along the normal direction at the resonance wavelength of the second nanoantenna may be less than 20%, in some examples less than 10%, in one example less than 5% of the scattering cross-section and the scattering rate, respectively, at the resonance wavelength of the first nanoantenna and/or vice-versa. In some examples, the magnitude of the intensity-normalized in-plane force of one or both of the first and second nanoantennas exhibits a zero crossing at the resonance wavelength of the other one of the first and second nanoantennas.

In some embodiments, $\vec{k}_{1,j}$ is substantially anti-parallel to $\vec{k}_{2,j}$ for j=L or j=R, wherein preferably $\vec{k}_{1,j}$ and $\vec{k}_{2,j}$ are substantially equal in magnitude. In other words, the first and second nanoantennas may be configured to scatter light of the same circular polarization j in substantially opposite directions. In addition to a torque generated by the antiparallel scattering of light, absorption of a photon may also transfer angular momentum to the nanodrone due to the spin of the absorbed photon, which is determined by the polarization of the light. In a preferred embodiment, the orientation of $\vec{k}_{1,j}$ and $\vec{k}_{2,j}$ is such that the torque generated by the scattering of light by the first and second nanoantennas is parallel to an angular momentum transferred to the nanodrone due to the spin of the incident photons for the respective circular polarization j=L or j=R.

Additionally or alternatively, $\vec{k}_{1,j}$ may be substantially parallel to $\vec{k}_{2,\bar{j}}$ for j=L or j=R with $\bar{j}$=R for j=L and $\bar{j}$=L for j=R, wherein preferably $\vec{k}_{1,j}$ and $\vec{k}_{2,\bar{j}}$ are substantially equal in magnitude. In other words, the first and second nanoantennas may be configured to scatter light of opposite circular polarizations in substantially the same direction. By parallel scattering of light of opposite circular polarizations a linear momentum may be transferred to the nanodrone as a result of the photon recoil while at the same time the angular momenta transferred to the nanodrone due to the spin of the photons absorbed by the first and second nanoantennas may cancel at least in part, which may facilitate the generation of a force without generating a net torque.

In one embodiment, all of $\vec{k}_{1,L}$, $\vec{k}_{1,R}$, $\vec{k}_{2,L}$ and $\vec{k}_{2,R}$ are non-zero, wherein $\vec{k}_{1,L}$ and $\vec{k}_{2,L}$ are substantially anti-parallel to each other, $\vec{k}_{1,R}$ and $\vec{k}_{2,R}$ are substantially anti-parallel to each other and $\vec{k}_{1,L}$ and $\vec{k}_{1,R}$ are substantially anti-parallel to each other. This may for example allow for rotating the nanodrone about the normal direction in one direction using left-circularly polarized light at the resonance wavelengths of the first and second nanoantennas and in the opposite direction using right-circularly polarized light at the resonance wavelengths of the first and second nanoantennas as well as for moving the nanodrone back and forth along an axis perpendicular to the normal direction using left-circularly polarized light at the resonance wavelength of the first nanoantenna and right-circularly polarized light at the resonance wavelength of the second nanoantenna or vice-versa.

In some embodiments, the two or more nanoantennas further comprise a third nanoantenna and a fourth nanoantenna in addition to the first and second nanoantennas, wherein each of the third and fourth nanoantennas is also arranged on and/or in the substrate and exhibits an optically addressable resonance at a respective resonance wavelength. Each of the third and fourth nanoantennas may also comprise one or more structures, in particular one or more electrically conductive structures, e.g. as described above for the first and second nanoantennas. Similar to the first and second nanoantennas, each of the third and fourth nanoantennas is configured to scatter circularly polarized light at the respective resonance wavelength that is incident on the respective nanoantenna along the normal direction, wherein photons of the scattered light have a mean wavevector $\vec{k}_{i,L}$ and $\vec{k}_{i,R}$ in a plane perpendicular to the normal direction for left- and right-circularly polarized light, respectively, with i=3 for the third nanoantenna and i=4 for the fourth nanoantenna. In some embodiments, the first to fourth nanoantennas may be arranged along a circle, in particular along a concentric circle around the center of the nanodrone, e.g. such that the first and second nanoantennas are arranged on opposite sides of the circle and the third and fourth nanoantennas are arranged on opposite sides of the circle. In one example, the first to fourth nanoantennas may for example be equally distributed around the circle, i.e. such that adjacent nanoantennas are separated by 90°, wherein the first nanoantenna may be adjacent to the third and fourth nanoantenna and opposite to the second nanoantenna.

Each of the third and fourth nanoantenna may be configured to scatter the incident light such that the mean wavevector $\vec{k}_{i,j_i}$ in the XY plane is non-zero for $j_i$=L or R with i=3 and i=4, respectively, wherein $j_3$ may be equal to $j_4$ (e.g. $\vec{k}_{3,L}$ and $\vec{k}_{4,L}$ may both be non-zero) or different from $j_4$ (e.g. $\vec{k}_{3,L}$ and $\vec{k}_{4,R}$ may both be non-zero). Each of the third and fourth nanoantennas may further be configured to scatter the incident light such that $\vec{k}_{i,\bar{j}}$ with $\bar{j}_i$=L for $j_i$=R and $\bar{j}_i$=R for $j_i$=L is substantially zero or substantially anti-parallel to $\vec{k}_{i,j_i}$. In other words, each of the third and fourth nanoantennas may also exhibit a chiral response similar to the first and second nanoantennas, wherein left-circularly polarized light is scattered differently than right-circularly polarized light and the force being transferred to the nanodrone may be switched off or reversed, respectively, by inverting the polarization of the incident light.

The wavevectors $\vec{k}_{i,j_i}$ for the first to fourth nanoantennas, i.e. the non-zero wavevectors for the first to fourth nanoantennas, may be mutually substantially perpendicular or substantially anti-parallel to each other, i.e. each pair of wavevectors $\vec{k}_{l,j_l}$, $\vec{k}_{m,j_m}$ with l=1, 2, 3, or 4, m=1, 2, 3, or 4 and l≠m may be either substantially perpendicular or substantially antiparallel. In some embodiments, the first to fourth nanoantennas may for example be arranged along a circle, in particular along a concentric circle around the center of the nanodrone, wherein the wavevectors $\vec{k}_{i,j_i}$ for adjacent nanoantennas (e.g. the first and third nanoantennas) may be substantially perpendicular to each other and the wavevectors $\vec{k}_{i,j_i}$ for opposing nanoantennas, i.e. nanoantennas with another nanoantenna arranged therebetween along the circle (e.g. the first and second nanoantennas), may be substantially antiparallel to each other. In some embodiments, each of the wavevectors $\vec{k}_{i,j_i}$ for the first to fourth nanoantennas may be substantially tangential to the circle on which the nanoantennas are arranged.

If the wavevectors $\vec{k}_{i,j_i}$ for the first to fourth nanoantennas are mutually substantially perpendicular or substantially anti-parallel to each other, a rotation of the nanodrone may be induced using nanoantennas having substantially anti-parallel wavevectors $\vec{k}_{i,j_i}$ (e.g. the first and second nanoantennas), while a translation of the nanodrone may be induced using nanoantennas having substantially perpendicular wavevectors $\vec{k}_{i,j_i}$ (e.g. the first and third nanoantennas). Translation along substantially orthogonal axes may be induced by switching between nanoantennas having substantially anti-parallel wavevectors $\vec{k}_{i,j_i}$, e.g. using the first and third nanoantennas to move along a first direction and using the second and third nanoantennas to move along a second direction that is substantially perpendicular to the first direction. Furthermore, a direction of motion may be reversed by switching between non-coinciding pairs of nanoantennas, e.g. using the first and third nanoantennas to move along the first direction and using the second and fourth nanoantennas to move along a third direction that is substantially anti-parallel to the first direction. Similarly, a direction or sense of rotation may also be reversed by switching between non-overlapping pairs of nanoantennas, e.g. using the first and second nanoantennas to rotate in a first direction of rotation and using the third and fourth nanoantennas to rotate in a second direction of rotation opposite to the first direction of rotation.

In some embodiments, $\vec{k}_{i,j}$ with j=L or R is non-zero and $\vec{k}_{i,\bar{j}}$ with $\bar{j}$=L for j=R and $\bar{j}$=R for j=L is substantially zero for each nanoantenna of a first pair of nanoantennas selected from the first, second, third, and fourth nanoantennas, e.g. for each of the first and second nanoantennas. The wavevector $\vec{k}_{i,\bar{j}}$ may be non-zero and $\vec{k}_{i,j}$ may be substantially zero for each nanoantenna of a second pair of nanoantennas that is non-overlapping with the first pair of nanoantennas, i.e. the second pair of nanoantennas consists of the two nanoantennas of the first, second, third, and fourth nanoantennas that are not contained in the first pair of nanoantennas, e.g. the third and fourth nanoantennas. This may allow for selectively addressing either the first pair of nanoantennas or the second pair of nanoantennas by choosing the polarization of the light accordingly without having to focus the incident light onto particular nanoantennas, but by illuminating the entire nanodrone homogeneously.

In some embodiments, the first pair of nanoantennas may consist of the first and second nanoantennas and the second pair of nanoantennas may consist of the third and fourth nanoantennas. A linear momentum may be transferred to the nanodrone by light having a pre-defined circular polarization (either L or R) using either one of the first and second nanoantennas and by light of the opposite circular polarization using either one of the third and fourth nanoantennas, whereas no linear momentum is transferred via any one of the first and second nanoantennas for the opposite circular polarization and via any one of the third and fourth nanoantenna for the pre-defined circular polarization.

Preferably, $\vec{k}_{1,j}$ is substantially anti-parallel to $\vec{k}_{2,j}$ with $\vec{k}_{3,\bar{j}}$ being substantially antiparallel to $\vec{k}_{4,\bar{j}}$ and substantially perpendicular to $\vec{k}_{1,j}$. In this way, a torque may be generated by illuminating the first and second nanoantennas with light of the pre-defined polarization j or by illuminating the third and fourth nanoantennas with light of the opposite polarization $\bar{j}$. A force may e.g. be generated by illuminating one of the first and second nanoantennas and one of the third and fourth nanoantennas.

In a preferred embodiment, a vector product of the non-zero wavevector $\vec{k}_{i,j}$ for the i-th nanoantenna and a connection vector $\vec{r}_i$ connecting the center of the nanodrone with a center of the i-th nanoantenna, $\vec{k}_{i,j}\times\vec{r}_i$, points in a first direction, e.g. substantially parallel to the normal direction, for the first and second nanoantennas and in a second direction substantially opposite to the first direction, e.g. substantially anti-parallel to the normal direction, for the third and fourth nanoantennas. Accordingly, a torque generated by illuminating the first and second nanoantennas and a torque generated by illuminating the third and fourth nanoantennas may be substantially anti-parallel.

In some embodiments, the resonance wavelengths of a third pair of nanoantennas selected from the first, second, third, and fourth nanoantennas are equal and the resonance wavelengths of a fourth pair of nanoantennas that is non-overlapping with the third pair of nanoantennas, i.e. consists of the two nanoantennas of the first, second, third, and fourth nanoantennas that are not contained in the third pair of nanoantennas are equal. The resonance wavelengths of the third pair may be different from each of the resonance wavelengths of the fourth pair. This may allow for selectively addressing either the third pair of nanoantennas or the fourth pair of nanoantennas by choosing the wavelength of the light accordingly without having to focus the incident light onto particular nanoantennas.

Preferably, the third pair of nanoantennas consists of a nanoantenna selected from the first pair of nanoantennas and a nanoantenna selected from the second pair of nanoantennas, e.g. the first and third nanoantennas. Correspondingly, the fourth pair of nanoantennas may consist of the other nanoantennas from the first and second pairs of nanoantennas, e.g. the second and fourth nanoantennas. This may allow for selectively addressing each of the four nanoantennas individually by choosing the wavelength and the polarization of the light accordingly without having to focus the incident light onto the respective nanoantenna.

A magnitude of the intensity-normalized in-plane force $|\vec{F}_{i,j_i}|/I_{in}$ imparted on a nanoantenna of the third pair, for example the first nanoantenna and/or the third nanoantenna, by scattering of circularly polarized light incident along the normal direction at the resonance wavelengths of one or both nanoantennas of the fourth pair, for example the second nanoantenna and/or the fourth nanoantenna, may e.g. be less than 20%, in some examples less than 10%, in one example less than 5% of the magnitude of the intensity-normalized in-plane force at the resonance wavelength of the respective nanoantenna of the third pair and/or vice-versa. In some examples, the magnitude of the intensity-normalized in-plane force of one or both nanoantennas of the third pair exhibits a zero crossing at the resonance wavelengths of one or both nanoantennas of the fourth pair. Additionally or alternatively, the magnitude of the intensity-normalized in-plane force of one or both nanoantennas of the fourth pair may exhibit a zero crossing at the resonance wavelengths of one or both nanoantennas of the third pair.

In some embodiments, the optically addressable resonance of some or all of the two or more nanoantennas is a plasmonic resonance. In other words, the incident light may couple to one or more plasmon modes, i.e. collective excitations of charge carriers such as electrons, in the respective nanoantenna, e.g. in the electrically conductive structures of the respective nanoantenna. Plasmonic resonances may for example occur in the visible spectrum for many metals, in particular noble metals such as gold, platinum, palladium and silver, but also in other metals such as aluminum and copper. Additionally or alternatively, the optically addressable resonance of some or all of the two or more nanoantennas may be a phononic resonance. In other words, the incident light may couple to one or more phonon modes, i.e. collective vibrational excitations of atoms, in the respective nanoantenna, e.g. in the electrically conductive structures of the respective nanoantenna. Phononic resonances may for example occur in the near-infrared spectrum. Additionally or alternatively, the optically addressable resonance of some or all of the two or more nanoantennas may also be a resonance involving a different kind of resonant light-matter interaction, for example a Mie resonance.

Some or all of the two or more nanoantennas may comprise one or more resonators, e.g. structures that support one or more resonantly enhanced excitation modes (resonator modes) such as phonon or plasmon modes that couple to light and/or optical modes. For example, a physical dimension such as a length of one or more of the structures of a nanoantenna may be chosen such that a standing wave may form within the respective structure. In this way, certain modes, e.g. excitation modes of the bulk material, may be resonantly enhanced while other modes may be suppressed. This may give rise to the optically addressable resonances of the respective nanoantenna. Each of the resonators may have a resonator axes, which may e.g. correspond to the axis of an electric or magnetic dipole moment associated with one or more of the resonantly enhanced excitation modes.

In a preferred embodiment, some or all of the two or more nanoantennas each comprise a pair of coupled resonators. A distance between the resonators of the pair may for example be sufficiently small such that charge accumulations in the two resonators interact via attractive and/or repulsive forces and/or such that the evanescent electromagnetic field of a resonator mode of one of the resonators leaks into the other resonator and vice-versa, thereby coupling the two resonators. Additionally or alternatively, the resonators of the pair may for example be coupled via a coupling element such as an electrically conductive structure and/or a dielectric structure connecting the resonators, wherein a width of the coupling element may for example be substantially smaller than a width of the resonators. A coupling strength between the resonators of the pair may be chosen such the pair of resonators exhibits common modes, e.g. a symmetric and an anti-symmetric superposition of resonator modes of the two individual resonators.

The coupling between the resonators may lead to a spectral splitting of the common modes, which may thus also be referred to as split modes. Preferably, the coupling and thus the spectral splitting is sufficiently small such that the respective common modes (and thus also superpositions of the respective common modes) may be excited by light of the same wavelength. The coupling may for example be small compared to a width of the resonance of respective nanoantenna and/or to a width of a resonance of one of the resonators.

The resonator axes of the resonators of the pair may be tilted with respect to each other, for example by an angle between 45° and 135°. The resonator axes may in particular be substantially perpendicular to each other. Preferably, the resonator axes are tilted with respect to each other by an angle between 80° and 100°, in some examples between 85° and 95°, in one example between 88° and 92°. Coupled resonators with tilted resonator axes may exhibit a chiral response, wherein left- and right-circularly polarized light may couple to different modes, e.g. to a symmetric and an anti-symmetric superposition, respectively, of common modes. This may give rise to a polarization-dependent distribution of the scattered light. A superposition of common modes may be localized on one of the resonators of the pair at least in part, i.e. the near field of the respective superposition of common modes may cancel on the other resonator at least in part. Light of the appropriate circular polarization may thus for example be used to selectively excite one of the resonators of the pair.

Some or all of the two or more nanoantennas may further comprise a third resonator each. The third resonator may be substantially parallel to a first resonator of the pair of coupled resonators of the respective nanoantenna. This may for example facilitate absorption and/or scattering of light emitted from the first resonator by the third resonator. Preferably, resonator axes of the first and third resonators are tilted with respect to each other by an angle between −10° and 10°, in some examples between −5° and 5°, in one example between −2° and 2°. A distance between the first and third resonators may be sufficiently large such that the first and third resonators are not coupled by evanescent fields, but may e.g. interact with each other via their electromagnetic far fields.

The first resonator of the pair of coupled resonators may for example be arranged adjacent to a first end of a second resonator of the pair of coupled resonators, e.g. such that a corner of the first resonator faces a corner of the second resonator, an end face of the second resonator and/or vice-versa. The first and second resonators may for example be arranged in a V-shaped or L-shaped configuration.

The third resonator may for example be arranged adjacent to a second end of the second resonator opposite to the first end, e.g. such that a corner of the third resonator faces a corner of the second resonator, an end face of the second resonator and/or vice-versa. The first, second and third resonators may for example be arranged in a U-shaped configuration. A nanoantenna with the first and third resonator being arranged adjacent to opposite ends of the second resonator may thus also be referred to as a U-type nanoantenna in the following. In some examples, the first and third resonators may be arranged such that the first and third resonators are mirror-symmetric with respect to the second resonator. The third resonator may also be coupled to the second resonator. In some embodiments, the first and third resonators are separated from the second resonator by the same distance.

Alternatively, the third resonator may be arranged such that the first resonator is arranged between the second end of the second resonator and the third resonator. The first, second and third resonators may for example be arranged in an F-shaped configuration with the first resonator being arranged adjacent to the first end of the second resonator and the third resonator being arranged on a far side of the first resonator as seen from the second end of the second resonator, e.g. such that the first resonator is arranged between the first end of the second resonator and the third resonator. A nanoantenna with the first resonator being arranged adjacent to the first end of the second resonator and between the third resonator and the second end of the second resonator may thus also be referred to as an F-type nanoantenna in the following.

Both, F-type and U-type nanoantennas may exhibit a polarization-dependent distribution of scattered light. Interference between the first and third resonators may break an inversion and/or rotational symmetry of the distribution of the scattered light upon illumination by circularly-polarized light and may thus give rise to a non-zero mean wavevector $\vec{k}_{i,j_i}$ in the XY plane for at least one circular polarization. For F-type nanoantennas, the mean wavevector $\vec{k}_{i,\bar{j}_i}$ with $\bar{j}_i$=L for $j_i$=R and $\bar{j}_i$=R for $j_i$=L may be substantially zero, whereas $\vec{k}_{i,\bar{j}_i}$ may be substantially anti-parallel to $\vec{k}_{i,j_i}$ for U-type nanoantennas. In some embodiments, the two or more nanoantennas may comprise only U-type nanoantennas, e.g. a pair of U-type nanoantennas, or only F-type nanoantennas, e.g. four F-type nanoantennas. In other embodiments, the two or more nanoantennas may also comprise both U-type and F-type nanoantennas.

In some embodiments, the arrangement of the two or more nanoantennas or of a subset thereof exhibits one or more symmetries, in particular symmetries with respect to the center of the nanodrone. The symmetric subset may in particular comprise or consist of the first and second nanoantennas or the first, second, third and fourth nanoantennas. One of the symmetries may for example be a discrete rotational symmetry around the center of the nanodrone, e.g. a two-fold (180°) or four-fold (90°) rotational symmetry. Additionally or alternatively, one of the symmetries may be a mirror/reflection symmetry with respect to one or more planes of symmetry extending through the center of the nanodrone. The one or more planes of symmetry may be spanned by a normal vector parallel to the normal direction and a respective in-plane vector perpendicular to the normal direction. The one or more planes of symmetry may in particular comprise a plane that is perpendicular to a connection vector between adjacent nanoantennas, e.g. between the first and third nanoantennas and/or between the first and fourth nanoantennas. In one example, the symmetries comprise a twofold rotational symmetry (which corresponds to an inversion/point symmetry) and a mirror symmetry.

In some embodiments, the two or more nanoantennas further comprise one or more roll nanoantennas and/or one or more pitch nanoantennas, e.g. for controlling rotational degrees of freedom about rotation axes perpendicular to the normal direction (pitch and/or roll). The one or more roll nanoantenna may be arranged along a pitch axis of the nanodrone that is substantially perpendicular to the normal direction, e.g. for controlling a rotational degree of freedom about a roll axis of the nanodrone that is substantially perpendicular to each of the normal direction and the pitch axis. The one or more pitch nanoantennas may be arranged along the roll axis, e.g. for controlling a rotational degree of freedom about the pitch axis. Similar to the other nanoantennas, each of the roll and pitch nanoantennas is arranged on and/or in the substrate and exhibits an optically addressable resonance at a respective resonance wavelength. Each of the roll and pitch nanoantennas may comprise one or more structures such as one or more electrically conductive structures, e.g. as described above for the first and second nanoantennas. Preferably, the pitch axis and/or the roll axis extend through the center of the nanodrone.

The roll and pitch nanoantennas may be configured to absorb and/or scatter light, in particular linearly and/or circularly polarized light, at the respective resonance wavelength that is incident on the respective nanoantenna along the normal direction. The roll and pitch nanoantennas may for example be configured to absorb the incident light and/or to scatter incident light symmetrically, e.g. such that the three-dimensional mean wavevector of the scattered photons is zero (i.e. the scattered/outgoing photons do not generate a net recoil and thus do not transfer a net momentum to the respective nanoantenna). The momentum carried by the photons of the incident light may thus generate a light pressure on the respective nanoantenna along the normal direction, which in turn may generate a torque about the roll or pitch axis, respectively. Some or all of the roll and pitch nanoantennas each may comprise a single structure such as a single electrically conductive structure, e.g. a single resonator. The single resonator may for example exhibit a dipole-like far-field scattering pattern, which is inversion symmetric such that the scattered photons have a mean wavevector of zero in all three dimensions. In some embodiments, some or all of the roll and pitch nanoantennas may have different resonance wavelengths, e.g. such that each roll and pitch nanoantenna may be addressed individually with light at the respective resonance wavelength.

In a preferred embodiment, some or all of the roll and pitch nanoantennas each comprise two pairs of coupled resonators, i.e. a first pair of coupled resonators and a second pair of coupled resonators. For each pair of resonators, the axes of the resonators of the respective pair may be tilted with respect to each other and may in particular be substantially perpendicular to each other, e.g. as described above. One or both resonators of the first pair of coupled resonators is/are substantially parallel to a respective resonator of the second pair of coupled resonators. In other words, a first resonator of the first pair may be substantially parallel to a first resonator of the second pair and/or a second resonator of the first pair may be substantially parallel to a second resonator of the second pair. This may for example facilitate absorption and/or scattering of light emitted from a resonator of one pair by the parallel resonator of the other pair and may lead to interference of light emitted and/or scattered by the two parallel resonators. The interference between these resonators may break an inversion and/or rotational symmetry of the far-field scattering pattern of the respective roll or pitch nanoantenna upon illumination by circularly-polarized light and may thus e.g. give rise to a non-zero mean wavevector in the normal direction for at least one circular polarization.

The first pair of coupled resonators may be arranged in a first plane on and/or in the substrate that is substantially perpendicular to the normal direction. The second pair of coupled resonators may be arranged in a second plane on and/or in the substrate that is substantially perpendicular to the normal direction and different from the first plane, e.g. above or below the first pair of resonators.

In some embodiments, a first resonator of the first pair may overlap with a first resonator of the second pair at least in part. The first resonator of the first pair and the first resonator of the second pair may thus also be referred to as overlapping resonators in the following. The overlapping resonators may overlap with each other at least in part when viewed along the normal direction, e.g. such that at least 50%, in some examples at least 75%, in one example at least 90% of a cross-sectional area of one or both of the overlapping resonators overlaps with the other overlapping resonator. Preferably, the overlapping resonators overlap completely, e.g. such that a projection of one or both of the overlapping resonators onto the other overlapping resonator along the normal direction is entirely contained within a circumference of the other overlapping resonator. A second resonator of the first pair may not overlap with a second resonator of the second pair, e.g. when viewed along the normal direction. The second resonator of the first pair and the second resonator of the second pair may thus also be referred to as non-overlapping resonators in the following. In some embodiments, one or both of the non-overlapping resonators may not overlap with any resonator of the respective other pair.

In some embodiments, each of the first and second pairs of coupled resonators comprises a central resonator and a distal resonator. The central resonators may e.g. be arranged adjacent to a center of the respective nanoantenna and the distal resonators may e.g. be arranged in outer portions of the respective nanoantenna. The distal resonators may for example be arranged adjacent to opposite ends of the central resonators. Preferably, the distal resonators extend in opposite directions from the respective end of the central resonators, in particular in directions that are substantially perpendicular to the resonator axes of the central resonators. For example, a proximal end of each distal resonator may be arranged adjacent to a respective end of the central resonators with the distal ends of the distal resonators facing away from the central resonators in opposite directions, e.g. such that each of the pairs of resonators is arranged in an L-shaped or V-shaped configuration with the L- or V-shaped configurations of the two pairs being rotated by 180° with respect to each other. The central resonators of the first and second pairs of coupled resonators may be substantially parallel to each other, e.g. to facilitate interference of light emitted from the two central resonators. In some embodiments, the central resonators may overlap with each other at least in part, i.e. the central resonators may be the overlapping resonators. The distal resonators may not overlap with each other, i.e. the distal resonators may be the non-overlapping resonators. In some embodiments, the distal resonators may also be substantially parallel to each other.

The roll and pitch nanoantennas may be configured to scatter the incident light asymmetrically for at least one circular polarization. The roll and pitch nanoantennas may in particular be configured to scatter the incident light such that the Z component of the mean wavevector of the scattered photons is different for the opposite circular polarizations, e.g. such that a force on the roll and pitch nanoantennas along the normal direction becomes polarization-dependent. This may be used to generate a torque about the roll or pitch axis. The total force on a given nanoantenna along the normal direction may comprise the light pressure generated by the incident light as well as a force generated by the scattered light in case of a non-zero Z component of the mean wavevector of the scattered photons (i.e. for asymmetric scattering).

Some or all of the roll and pitch nanoantennas may for example be configured to scatter the incident light such that the Z component of the mean wavevector is non-zero for one circular polarization (i.e. asymmetric scattering), e.g. to compensate a light pressure generated by the incident light along the normal direction at least in part or to enhance the light pressure, but substantially zero for the opposite circular polarization (e.g. symmetric scattering). Additionally or alternatively, some or all of the roll and pitch nanoantennas may for example be configured to scatter the incident light such that the Z component of the mean wavevector is non-zero for both circular polarizations, but substantially anti-parallel for opposite polarizations, e.g. such that the light pressure is compensated at least in part for one polarization (i.e. the Z component of the mean wavevector points along the normal direction, thus generating a recoil in a direction opposite to the normal direction) and enhanced for the opposite polarization (i.e. the Z component of the mean wavevector is opposite to the normal direction, thus generating a recoil parallel to the normal direction). The total force on the respective nanoantenna generated by the incident light and by the scattered light may thus be smaller for one circular polarization than for the opposite circular polarization. This may allow for generating a torque that is substantially collinear with the roll or pitch axis as well as a force that is substantially collinear with the normal direction.

Asymmetric scattering with different Z components of the mean wavevector of the scattered photons for the opposite polarizations may for example arise due to interference between resonators of the first and second pairs of coupled resonators. This may be achieved by choosing an appropriate arrangement of the resonators, in particular by adapting the distances between the resonators, the orientations of the resonators, the resonance wavelengths of the resonators, and/or an overlap between the resonators. The arrangement of the resonators may for example be chosen such that modes localized on different resonators, e.g. either on the central resonator or on the distal resonator, may be excited with left- and right-circularly polarized light, respectively, for one or both of the first and second pairs of resonators. The arrangement of the resonators may further be chosen such that, for one or both circular polarizations, a mode excited in the first pair, e.g. a mode localized on the distal resonator of the first pair, and a mode excited in the second pair, e.g. a mode localized on the distal resonator of the second pair, interfere destructively in a direction that is substantially parallel or substantially anti-parallel to the normal direction. Furthermore, the arrangement of the resonators may also be chosen such that a resonator of the first pair, e.g. an overlapping/central resonator of the first pair, blocks light at least in part that would otherwise reach a resonator of the second pair, e.g. an overlapping/central resonator of the second pair, thereby creating a "shadow" on the respective resonator of the second pair, and/or vice-versa.

In some embodiments, the roll nanoantennas may comprise a first roll nanoantenna and a second roll nanoantenna arranged along the pitch axis on opposite sides of the center of the nanodrone, in particular symmetric with respect to the center of the nanodrone. The first roll nanoantenna may be configured to scatter light incident along the normal direction such that the Z component of the mean wavevector of the scattered photons is non-zero for a circular polarization j=L or j=R (e.g. to compensate the light pressure at least in part or to enhance the light pressure) and substantially zero for the opposite circular polarization $\bar{j}$=R for j=L and $\bar{j}$=L for j=R (e.g. such that only the light pressure acts on the first roll nanoantenna). The second roll nanoantenna may be configured to scatter light incident along the normal direction such that the Z component of the mean wavevector of the scattered photons is non-zero for the opposite circular polarization $\bar{j}$ and substantially zero for the circular polarization j. The first and second roll nanoantennas may for example be mirror-symmetric with respect to each other. This may allow for generating a torque about the roll axis using circularly polarized light with the direction of the torque being opposite for left- and right-circularly polarized light. A force along the normal direction may for example be compensated using a pair of counter-propagating beams, e.g. a circularly polarized beam and a linearly polarized beam or a pair of circularly polarized beams having opposite circular polarizations, and balancing a power of the beams appropriately to only generate a torque, but no net force. Furthermore, a force along the normal direction may for example be generated using a single linearly polarized beam and/or by adjusting a power and/or a polarization of the counter-propagating beams. Preferably, the resonance wavelengths of the first and second roll nanoantennas are equal.

Similarly, the pitch nanoantennas may comprise a first pitch nanoantenna and a second pitch nanoantenna in a corresponding configuration along the roll axis. Preferably, the resonance wavelengths of the first and second pitch nanoantennas are equal, but different from the resonance wavelengths of the first and second roll nanoantennas. This may allow for addressing the roll and pitch nanoantennas independently using light of the respective resonance wavelengths. In other examples, the first roll nanoantenna and the first pitch nanoantenna may have a first resonance wavelength and the second roll nanoantenna and the second pitch nanoantenna may have a second resonance wavelength different from the first resonance wavelength. To address the roll and pitch nanoantennas independently, both roll nanoantennas may for example be configured to scatter light incident along the normal direction such that the Z components of the mean wavevectors of the scattered photons are non-zero, but substantially anti-parallel to each other for the polarization j and substantially zero for the opposite polarization $\bar{j}$, whereas both pitch nanoantennas may for example be configured to scatter light incident along the normal direction such that the Z components of the mean wavevectors of the scattered photons are non-zero, but substantially anti-parallel to each other for the opposite polarization $\bar{j}$ and substantially zero for the polarization j, or vice-versa.

The invention further provides a method of operating a nanodrone according to any one of the embodiments described herein. The method comprises illuminating the nanodrone substantially along the normal direction with polarized light at the resonance wavelength of the first nanoantenna and polarized light at the resonance wavelength of the second nanoantenna. The polarization of the light at the resonance wavelength of the first nanoantenna and the polarization of the light at the resonance wavelength of the second nanoantenna are chosen such that the linear momenta transferred to the nanodrone by light scattered by the first and second nanoantennas generate a force acting on the nanodrone that is substantially perpendicular to the normal direction and/or a torque acting on the nanodrone that is substantially collinear with the normal direction.

The light for illuminating the nanodrone may for example be generated using an illumination system such as the one of the system for operating a nanodrone according to any one of the embodiments described below. The nanodrone may be illuminated with unfocused light, e.g. with one or more collimated beams of light, for example such that the entire nanodrone is illuminated homogeneously. The polarized light at the resonance wavelengths of the first and second nanoantennas may for example be circularly polarized light, elliptically polarized light and/or linearly polarized light.

For example, the polarizations of the light may be chosen such that the mean in-plane wavevectors of photons of the light scattered by the first and second nanoantennas and thus the transferred linear momenta are both non-zero and substantially anti-parallel to each other to generate a torque that is substantially collinear with the normal direction, i.e. substantially parallel or substantially anti-parallel to the normal direction. Thereby, the nanodrone may e.g. be rotated about an axis that is substantially parallel to the normal direction, which may also be referred to as a yaw axis.

In another example, the polarizations of the light may be chosen such that the mean in-plane wavevectors of photons of the light scattered by the first and second nanoantennas and thus the transferred linear momenta are both non-zero and substantially parallel to each other to generate a force that is substantially perpendicular to the normal direction. Thereby, the nanodrone may e.g. be moved or translated along a direction that is substantially perpendicular to the normal direction. In addition to the force generated by the scattered light, which is substantially perpendicular to the normal direction, the incident light illuminating the nanodrone may generate a light pressure on the nanodrone, i.e. an additional force along the direction of incidence, which is substantially parallel to the normal direction. In some embodiments, the light pressure may be compensated by a counter-acting force at least in part, e.g. as detailed below.

In yet another example, the polarizations of the light may be chosen such that the mean in-plane wavevector of photons of the light scattered by one of the first and second nanoantennas is non-zero, whereas the mean in-plane wavevector of photons of the light scattered by the other nanoantenna is substantially zero, e.g. to generate a force as well as a torque.

In some embodiments, the resonance wavelengths of the first and second nanoantennas are different. Intensities of the light at the resonance wavelengths of the first and second nanoantennas may be chosen such that a force, but no net torque or a torque, but no net force is generated. For example, the intensities may be adjusted such that the linear momenta transferred by the first and second nanoantennas are substantially equal in magnitude. If the mean wavevectors of the photons scattered by the first and second nanoantennas are substantially anti-parallel, the forces generated by the two nanoantennas may cancel such that the total force (net force) on the nanodrone is substantially zero. If the wavevectors are substantially parallel, the torques generated by the two nanoantennas may cancel such that the total torque (net torque) on the nanodrone is substantially zero.

In some embodiments, the method may further comprise adjusting the polarization, the intensity and/or the wavelength of the light to change a direction of the force and/or of the torque. Additionally or alternatively, the method may comprise adjusting the polarization, the intensity and/or the wavelength of the light to generate a force instead of a torque or vice-versa. The method may further comprise adjusting the polarization, the intensity and/or the wavelength of the light to change a magnitude of the force and/or of the torque. The polarization, the intensity and/or the wavelength of the light may for example be adjusted such that the nanodrone performs a pre-defined movement, e.g. moves along a pre-defined path. In some embodiments, only the polarization and/or the intensity of the light are adjusted to perform some or all of the aforementioned actions. All other parameters of the light such as the direction of incidence, the intensity pattern in the vicinity of the nanodrone and the wavelength may not be adjusted, i.e. may remain constant.

Adjusting the polarization and the intensity, respectively, of the light may comprise adjusting the respective parameter of the light at the resonance wavelengths of one or both of the first and second nanoantennas. The nanodrone may e.g. be maneuvered by adjusting the Stokes parameters $S_0$ and $S_3$ of the incident light, i.e. the total power of the incident light and the difference in power between the left- and right-circularly polarized components of the light, at one or both of the resonance wavelengths. In some examples, only the Stokes parameters $S_0$ and $S_3$ of the incident light may be adjusted, whereas all other parameters of the light may remain constant.

A polarization of the light at the resonance wavelength of one or both of the first and second nanoantennas may for example be inverted (e.g. left-circular polarization instead of right-circular polarization) or changed to linear polarization such that the respective transferred linear momentum is substantially zero or substantially anti-parallel to its former orientation. Similarly, a polarization of the light at the resonance wavelength of one or both of the first and second nanoantennas may be changed to elliptical polarization, e.g. to adjust a magnitude of the respective mean wavevector of the scattered photons and thus of the transferred linear momentum.

An intensity of the light at the resonance wavelength of one of the first and second nanoantennas may for example be decreased, in particular decreased to zero, e.g. to only address one of the first and second nanoantennas. In some examples, the polarization of the light may be adjusted simultaneously while adjusting the intensity.

Adjusting the wavelength of the light may for example comprise adjusting the wavelength from the resonance wavelength of one nanoantenna to a resonance wavelength of another nanoantenna, e.g. by reducing the intensity at the resonance wavelength of one nanoantenna to zero while increasing the intensity at the resonance wavelength of the other nanoantenna from zero or by continuously shifting the wavelength from the resonance wavelength of one nanoantenna to the one of the other nanoantenna. The wavelength of the light may for example be adjusted such that the light becomes resonant with another nanoantenna different from the first and second nanoantennas.

In some embodiments, the nanodrone may comprise a third nanoantenna and a fourth nanoantenna in addition to the first and second nanoantennas, e.g. as described above. The polarization, the intensity and/or the wavelength of the light may for example be chosen such that initially the linear momentum transferred by the first nanoantenna is non-zero, whereas the linear momentum transferred by the third nanoantenna is substantially zero, e.g. to generate a torque in combination with one of the other nanoantennas such as the second nanoantenna. The polarization, the intensity and/or the wavelength of the light may subsequently be adjusted such that the linear momentum transferred by the first nanoantenna is substantially zero, whereas the linear momentum transferred by the third nanoantenna is non-zero, e.g. to generate a force instead of a torque. Similarly, the polarization, the intensity and/or the wavelength of the light may be adjusted to switch between the second and fourth nanoantennas, e.g. to reverse a direction of the torque or of the force or to generate a force in a perpendicular direction.

In a preferred embodiment, the method may further comprise determining an orientation of the nanodrone in a plane that is substantially perpendicular to the normal direction, e.g. in the XY plane. The orientation of the nanodrone may for example be determined by imaging the drone with an imaging system such as a microscope and/or by observing an intensity distribution of the light scattered by the nanoantennas. The direction of the linear momenta transferred by the nanoantennas may be determined by an orientation of the nanoantennas and may thus be fixed in the reference frame of the nanodrone, but may depend on the orientation of the nanodrone in an external reference frame.

The method may further comprise adjusting the polarization, the intensity and/or the wavelength of the light based on the determined orientation of the nanodrone. In particular, the aforementioned parameters may be adjusted such that a direction of the force acting on the nanodrone is maintained, e.g. to maintain a direction of motion of the nanodrone by accounting for a change in the orientation of the nanodrone. For example, an ellipticity of the polarization of the light at the resonance wavelength of one or more nanoantennas, e.g. one or both of the first and second nanoantennas, may be adjusted to account for a change in the orientation of the nanodrone, e.g. by increasing or decreasing the ellipticity accordingly. Additionally or alternatively, the intensity of the light at the resonance wavelength of one or more nanoantennas, e.g. one or both of the first and second nanoantennas, may be adjusted to account for a change in the orientation of the nanodrone, e.g. by increasing the intensity at the resonance wavelength of one of the first and second nanoantennas while decreasing the intensity at the resonance wavelength of the other one of the first and second nanoantennas or vice-versa.

In some embodiments, the method may further comprise providing a bottom surface above which the nanodrone is to be operated. The bottom surface extends perpendicular to the normal direction and may for example be a flat surface that is perpendicular or substantially perpendicular to the normal direction. In other embodiments, the bottom surface may also be a curved surface. The bottom surface may be optically transparent, in particular at the resonance wavelengths of the nanoantennas. In some embodiments, the bottom surface may be formed by a bottom wall of a chamber or cell or a bottom wall of a well or recess that the nanodrone is to be operated in. The chamber or well may be filled with a liquid such as water or an aqueous solution at least in part.

The method may comprise generating a repulsive force between the bottom surface and the nanodrone to counteract a light pressure generated by the illuminating light, e.g. to at least partially compensate a linear momentum along the normal direction transferred to the nanodrone by absorption and/or scattering of photons from the incident light. This may for example prevent the nanodrone from being pushed downwards by the illuminating light and from coming in contact with the bottom surface. The repulsive force may for example be such that the nanodrone hovers above the bottom surface at a substantially constant distance, which may for example be on the order of a few hundred nanometers.

The repulsive force may in particular be an electrostatic force generated by electrically charging the bottom surface and the nanodrone with a same polarity. This may for example be achieved by providing an electrolyte solution that is in contact with the bottom surface and the nanodrone. The electrolyte solution may for example comprise sodium chloride and/or an anionic or cationic surfactant such as sodium dodecyl sulfate, ammonium lauryl sulfate, sodium laureth sulfate, sodium lauroyl sarcosinate, cetrimonium bromide, and/or benzalkonium chloride. In other examples, the repulsive force may e.g. be a magnetic force, i.e. the nanodrone may be suspended above the bottom surface by magnetic levitation. In some embodiments, the light pressure generated by the illuminating light may additionally or alternatively also be counteracted by a light-induced force. The nanodrone may for example be confined along the vertical direction in a focused sheet of light.

The invention further provides a system for operating a nanodrone according to any one of the embodiments described herein. The system comprises an illumination system configured to generate polarized light at the resonance wavelength of the first nanoantenna and at the resonance wavelength of the second nanoantenna. The illumination system is configured to adjust a polarization and an intensity of the light at the resonance wavelengths of the first and second nanoantennas. The system further comprises an imaging system for imaging the nanodrone and a controller for controlling the illumination system. The controller is configured to obtain a motion command that specifies a movement that is to be performed with the nanodrone. The controller is further configured to determine an orientation of the nanodrone from an image obtained from the imaging system and to determine polarizations and intensities for the light generated by the illumination system at the resonance wavelengths of the first and second nanoantennas based on the motion command and the determined orientation. The controller is also configured to illuminate, using the illumination system, the nanodrone with light at the resonance wavelengths of the first and second nanoantennas with the determined polarizations and intensities to perform the movement specified by the motion command.

The illumination system may comprise one or more light sources, in particular coherent light sources such as lasers for generating light at the resonance wavelengths of the first and second nanoantennas. In some embodiments, an output power of some or all of the one or more light sources may be adjustable, e.g. to adjust the intensity of the light. The illumination system may further comprise polarization optics such as one or more polarizers and/or one or more wave plates for controlling the polarization of the light. The illumination system may also comprise one or more means for controlling the intensity of the light, wherein the one or more means for controlling the intensity of the light may for example comprise an acousto-optic modulator, an electro-optic modulator, an adjustable wave plate in combination with a polarizer, and/or an element having an adjustable transmission such as a variable neutral-density filter. In some embodiments, the illumination system may further be configured to generate light at wavelengths other than the resonance wavelengths of the first and second nanoantennas, e.g. at one or more resonance wavelengths of other nanoantennas, and to adjust a polarization and an intensity thereof.

The illumination system may be configured to illuminate the nanodrone along the normal direction and/or substantially along the normal direction, e.g. using a pair of beams comprising a first beam of light at the resonance wavelength of the first nanoantenna and a second beam of light at the resonance wavelength of the second nanoantenna. The illumination system may comprise one or more focusing elements such as lenses, e.g. for generating one or more collimated beams of light. In some embodiments, the illumination system may further be configured to illuminate the nanodrone in a direction opposite to the normal direction, e.g. using a pair of counter-propagating beams comprising a third beam of light at the resonance wavelength of the first nanoantenna and a fourth beam of light at the resonance wavelength of the second nanoantenna. The illumination system may be configured to control the polarizations and the intensities of each of the beams independently.

The imaging system may be configured to take images of the nanodrone during operation, wherein the images may in particular be taken along the normal direction and/or substantially along the normal direction. The imaging system may for example comprise a microscope, wherein the microscope may e.g. be configured to image a plane that is perpendicular or substantially perpendicular to the normal direction. The imaging system may be configured to image the nanodrone at a wavelength that is not resonant with any of the nanoantennas and/or using unpolarized or linearly polarized light, e.g. to reduce scattering of light by the nanoantennas and/or a force acting on the nanodrone. For this, the imaging system may e.g. comprise an additional light source. Additionally or alternatively, the imaging system may also be configured to image the nanodrone at a wavelength that is resonant with one or more of the nanoantennas and/or using circularly polarized light, e.g. to determine a position of the respective nanoantennas. For this, the imaging system may for example use light generated by the illumination system.

The controller may be implemented in hardware, software or a combination thereof. The controller may for example comprise a processor and a storage medium containing instructions for execution by the processor to provide the functionality described herein. In some embodiments, the controller may be configured to execute some or all of the steps of the method of operating a nanodrone according to any one of the embodiments described herein.

The motion command may for example specify a translation and/or a rotation that is to be performed with the nanodrone, e.g. a direction and a distance for a linear translation of the nanodrone and/or a direction and an angle for a rotation of the nanodrone. The motion command may further specify a velocity and/or an angular velocity at which the nanodrone is to be moved. The motion command may also specify more complex maneuvers, which may e.g. involve a translation and a rotation that are to be performed simultaneously and/or a sequence of one or more translations and/or one or more rotations. The motion command may in particular specify a path along which the nanodrone is to be moved. The motion command may also specify a velocity profile with which the nanodrone is to be moved along the specified path. The motion command may for example be received from a user or from another device. In some embodiments, the motion command may also be generated and/or modified by the controller itself, e.g. as part of a feedback control loop. In one example, the motion command may for example specify a position and/or an orientation at which the nanodrone is to be held.

The orientation of the nanodrone may for example be determined by determining one or more rotation angles of the nanodrone, e.g. one or more Euler angles, relative to a stationary axis of reference such as an axis in a reference frame of the illumination and/or imaging system, e.g. the normal direction or an axis perpendicular to the normal direction. The controller may determine the orientation of the nanodrone by determining the position of one or more reference points on the nanodrone and/or the orientation of one or more reference axes of the nanodrone in the image obtained from the microscope. The one or more reference points may for example comprise one or more nanoantennas, a center of the nanodrone, and/or one or more reference features on the nanodrone, wherein the one or more reference features may for example comprise a notch and/or a protrusion along a circumference of the nanodrone, an opening or hole in the nanodrone, and/or a protrusion and/or a recess on a top or bottom surface of the nanodrone. The one or more reference axes may for example comprise one or more axes of symmetry of the nanodrone, a longitudinal axes along which the nanodrone has the largest extent, and/or a transverse axis along which the nanodrone has the smallest extent. In some embodiments, the controller may also be configured to determine a position of the nanodrone from the image obtained from the imaging system, e.g. by determining the position of the center of the nanodrone.

The controller may be configured to determine the polarization and the intensity for each of the beams generated by the illumination system. For determining the polarizations and intensities for the light generated by the illumination system, the controller may for example be configured to transform the motion command into a reference frame of the nanodrone, e.g. by applying a rotation by the determined rotation angles to the motion command. The controller may further be configured to determine a magnitude and/or a direction of a force and/or a magnitude and/or a direction of a torque that is to be applied to the nanodrone based on the motion command and the determined orientation, e.g. based on the transformed motion command. The controller may further be configured to determine the polarizations and the intensities for the light at the resonance wavelengths of the first and second nanoantennas based on the determined force and/or on the determined torque, e.g. by applying a corresponding transformation, which may for example be based on a mathematical model and/or a pre-determined calibration curve for the nanodrone.

The controller may be configured to control some or all of the elements of the illumination system. The controller may in particular be configured to control an output power of some or all of the light sources of the illumination system and/or to control one or more means for controlling the intensity of the light for adjusting an intensity of the light at the resonance wavelengths of the first and second nanoantennas, e.g. to the determined values. The controller may further be configured to control one or more wave plates and/or polarizers for adjusting the polarization of the light at the resonance wavelengths of the first and second nanoantennas, e.g. to the determined values.

In some embodiments, the system for operating a nanodrone may comprise one or more nanodrones according to any one of the embodiments described herein. Additionally or alternatively, the system may also comprise one or more chambers or wells that the nanodrone is to be operated in.

LIST OF FIGURES

Figure 3A:
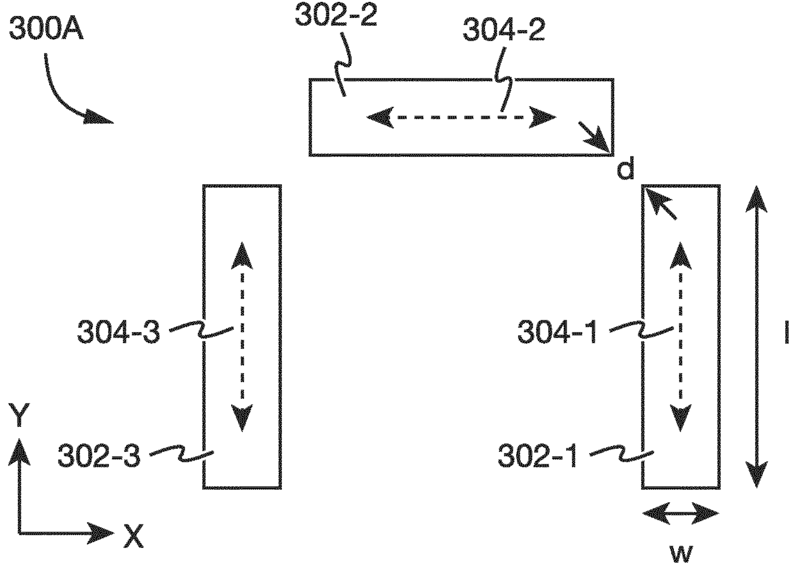
Figure 3B:
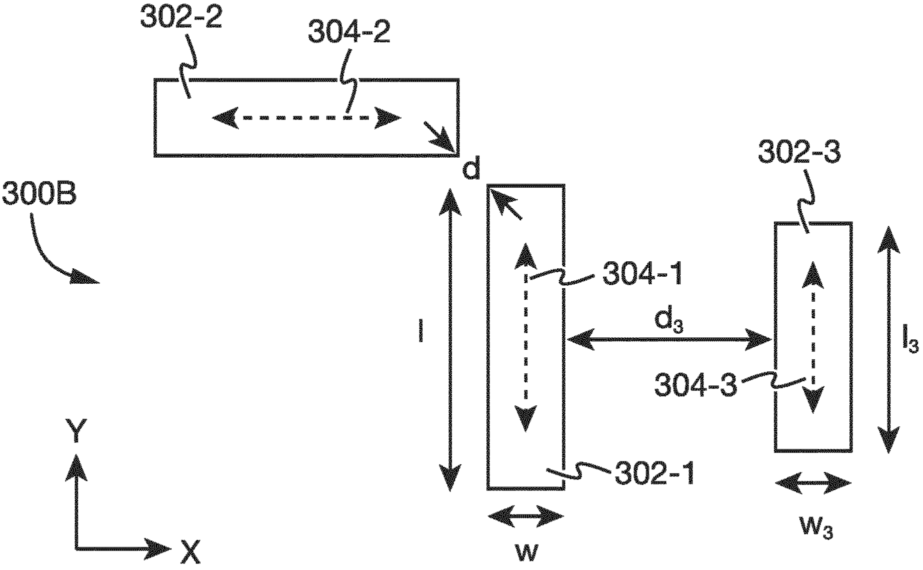
Figure 4:
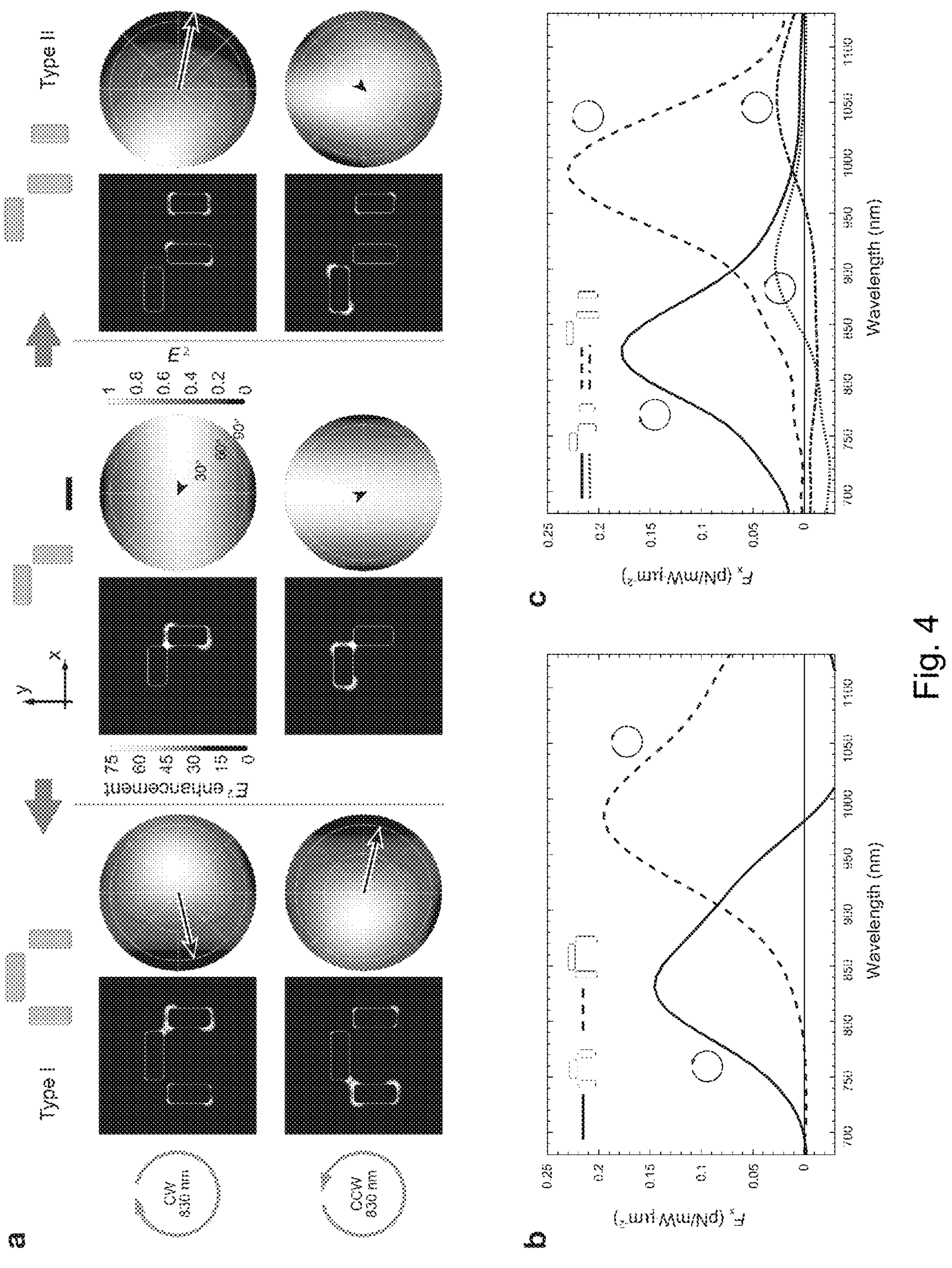

In the following, a detailed description of the invention and exemplary embodiments thereof is given with reference to the figures. The figures show schematic illustrations of FIG. 1*a*: a nanoantenna for a nanodrone according to an exemplary embodiment of the invention in top view when illuminated by right-circularly polarized light;

FIG. 1*b*: the nanoantenna of FIG. 1*a* in side view;

FIG. 1*c*: the nanoantenna of FIG. 1*a* according to an exemplary embodiment of the invention in top view when illuminated by left-circularly polarized light;

FIG. 1*d*: the nanoantenna of FIG. 1*a* according to another exemplary embodiment of the invention in top view when illuminated by left-circularly polarized light;

FIG. 2*a*: a nanodrone comprising a pair of nanoantennas in accordance with an exemplary embodiment of the invention when illuminated using a first illumination scheme;

FIG. 2*b*: the nanodrone of FIG. 2*a* when illuminated using a second illumination scheme;

FIG. 3*a*: a nanoantenna comprising a plurality of resonators according to an exemplary embodiment of the invention in top view;

FIG. 3*b*: a nanoantenna comprising a plurality of resonators in accordance with another exemplary embodiment of the invention in top view;

FIG. 4: the generation of directed forces using the nanoantennas of FIGS. 3*a* and 3*b;*

FIG. 5*a*: a nanodrone with a pair of nanoantennas comprising resonators according to an exemplary embodiment of the invention;

FIG. 5*b*: a nanodrone with four nanoantennas comprising resonators in accordance with an exemplary embodiment of the invention;

FIG. 6: illumination schemes for addressing motional degrees of freedom of the nanodrones of FIGS. 5*a* and 5*b;*

Figure 7:
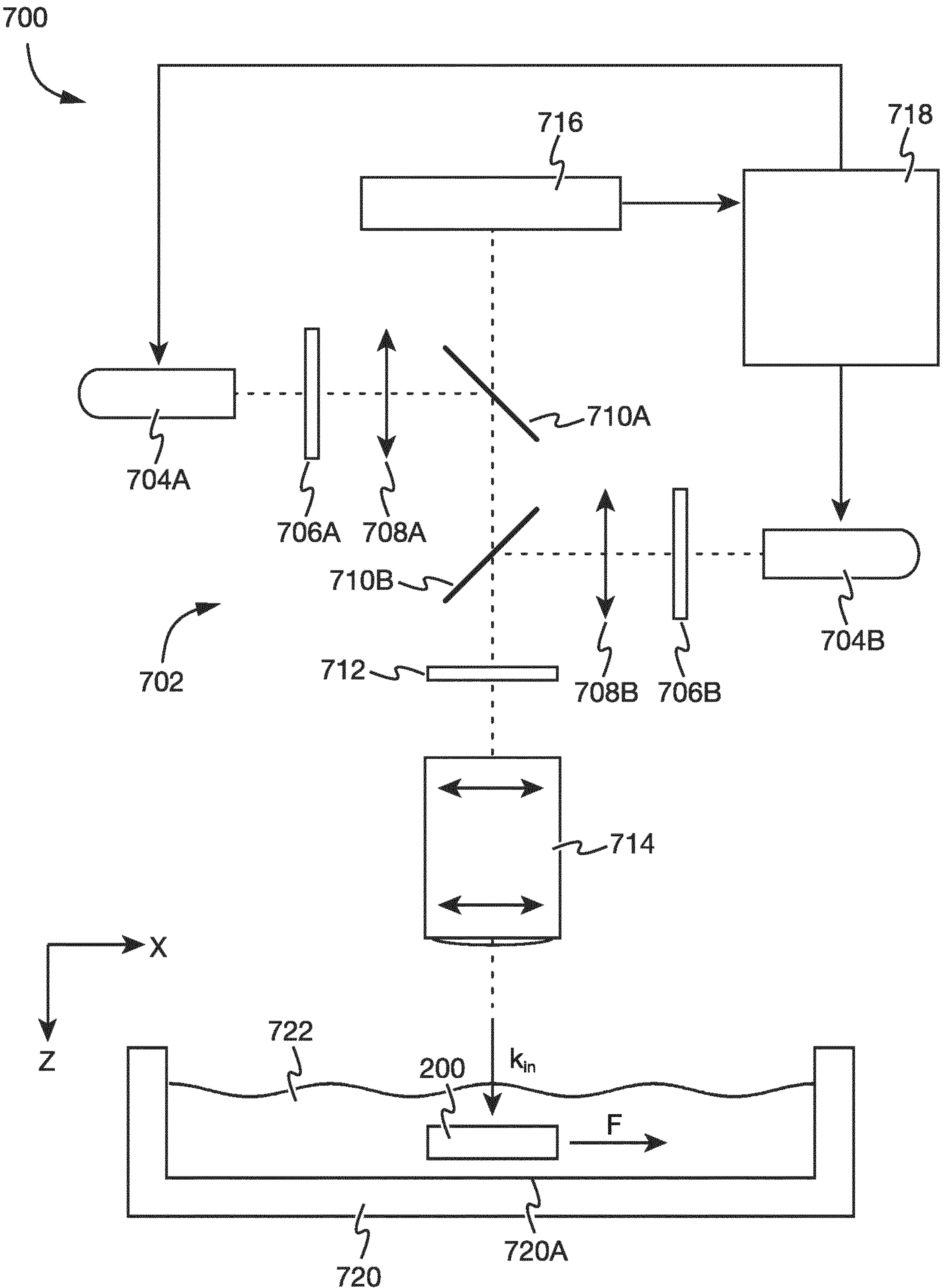
Figure 8:
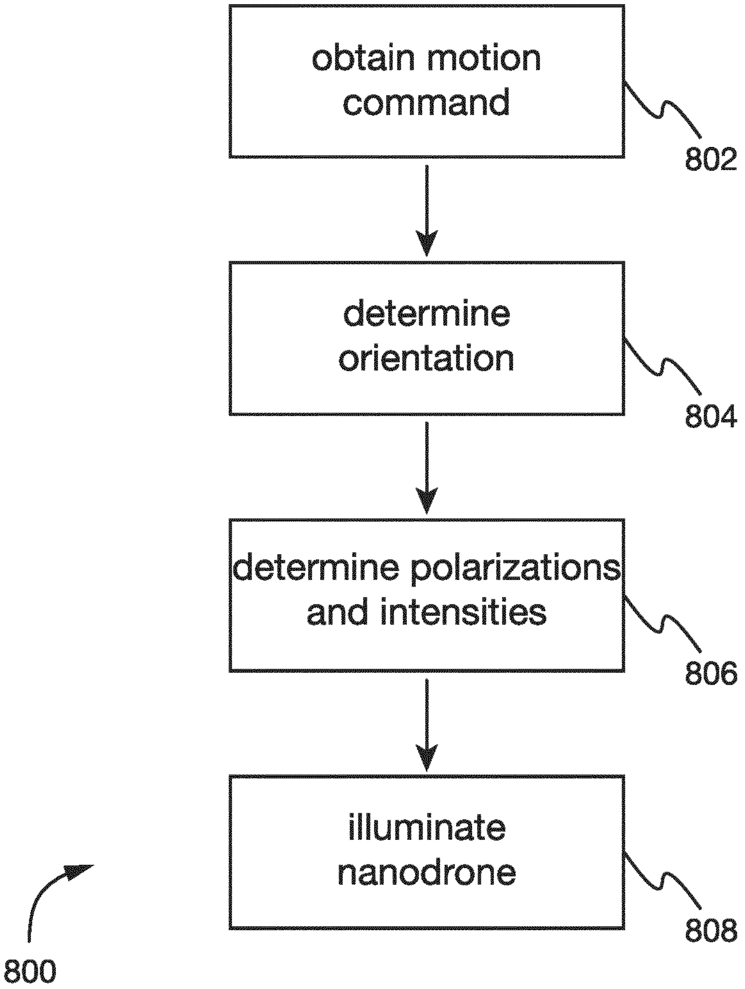
Figures 9, 10:
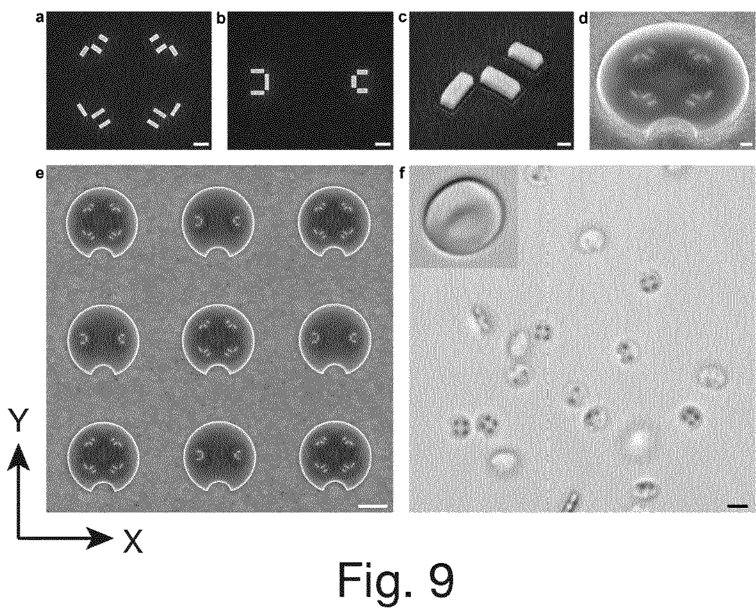

FIG. 7: a system for operating a nanodrone according to an exemplary embodiment of the invention;

FIG. 8: a flow chart of a method of operating a nanodrone in accordance with an exemplary embodiment of the invention;

FIG. 9: scanning electron and optical micrographs of nanodrones according to exemplary embodiments of the invention;

FIG. 10: experimental data demonstrating independent control over the motional degrees of freedom in two dimensions for a nanodrone with four nanoantennas in accordance with an exemplary embodiment of the invention;

FIG. 11*a*: a roll/pitch nanoantenna for a nanodrone according to an exemplary embodiment of the invention in top view;

FIG. 11*b*: the roll/pitch nanoantenna of FIG. 11*a* in side view; and

FIG. 12: a nanodrone with roll and pitch nanoantennas in accordance with an exemplary embodiment of the invention in top view.

DESCRIPTION OF THE PREFERRED EMBODIMENTS

FIGS. 1*a* and 1*b* show schematic illustrations (not to scale) of a nanoantenna 100 for a nanodrone according to an exemplary embodiment of the invention such as the nanodrone 200 of FIGS. 2*a* and 2*b*. In FIG. 1*a*, the nanoantenna 100 is shown in top view along the Z axis of FIG. 1*b*, which may also be referred to as the normal axis in the following. In FIG. 1*b*, the nanoantenna 100 is shown in side view along the Y axis of FIG. 1*a*.

The nanoantenna 100 comprises one or more structures (not shown), in particular electrically conductive structures such as for example nanoscale metallic rods as detailed below with reference to FIGS. 3*a* and 3*b*. The nanoantenna 100 exhibits an optically addressable resonance at a resonance wavelength, at which light incident on the nanoantenna is scattered resonantly, e.g. by resonant coupling to one or more excitations modes such as plasmon modes or phonon modes in the electrically conductive structures of the nanoantenna 100. This may lead to an enhanced scattering cross-section and thus an enhanced scattering rate for light at the resonance wavelength as e.g. described below with reference to FIG. 4.

The nanoantenna 100 is configured to asymmetrically scatter circularly polarized light at its resonance wavelength that is incident along a normal direction and has a first circular polarization $j_{in}$=L (left-circular polarization/clockwise polarization) or R (right-circular polarization/counter-clockwise polarization) such that a far-field scattering pattern of the nanoantenna 100, i.e. an intensity distribution $I_{out}$ of the light scattered by the nanoantenna 100, is not symmetric when projected onto a plane perpendicular to the normal direction, e.g. such that the far-field scattering pattern when projected onto this plane is not inversion symmetric. The nanoantenna 100 may for example be configured to scatter the light such that $I_{out}(\theta, \varphi) \neq I_{out}(\pi-\theta, \varphi+\pi)$ and $I_{out}(\theta, \varphi) \neq I_{out}(\theta, \varphi+\pi)$ with θ and φ being the polar and azimuthal angle, respectively, with respect to the normal direction, i.e. such that the (three-dimensional) far-field scattering pattern is neither inversion symmetric with respect to the origin nor rotationally symmetric about the normal direction.

In the example of FIGS. 1*a*, 1*b*, the normal direction corresponds to the Z direction of FIG. 1*b*, i.e. the incident light has a wavevector $k_{in}$ that is parallel to the Z direction of FIG. 1*b*, and the first circular polarization is the right-circular polarization ($j_{in}$=R) as indicated by the counter-clockwise arrow in FIG. 1*a*. Due to the asymmetric scattering by the nanoantenna 100, photons of the scattered light have a mean wavevector $\vec{k}_R$ in the XY plane perpendicular to the Z direction, which is also referred to as the in-plane wavevector $\vec{k}_R$ in the following, that is non-zero as indicated by the horizontal arrow in FIGS. 1*a*, 1*b*. In other words, the wavevector of a photon scattered by the nanoantenna 100 has a non-zero expectation value in the XY plane, i.e. one or both of the X and Y components (in-plane components) of the wavevector are non-zero. In addition, the Z component of the wavevector may also be non-zero in some examples (not shown in FIGS. 1*a*, 1*b*). As the in-plane components of the wavevector of the incident light are non-zero, the scattering of the light generates a recoil. Thereby, linear momentum is transferred to the nanoantenna 100, generating a force on the nanoantenna 100 that points in a direction opposite to the in-plane wavevector in the XY plane.

The nanoantenna 100 may be implemented in one of two types, which differ in their response to light of the opposite circular polarization $\bar{j}$=R for j=L and $\bar{j}$=L for j=R and are schematically illustrated in FIGS. 1*c* and 1*d*.

The nanoantenna 100A of the first type shown in FIG. 1*c* is configured to scatter circularly polarized light at its resonance wavelength that is incident along the normal direction and has the opposite circular polarization $\bar{j}$ (with $\bar{j}$=L in the example of FIG. 1*c*) asymmetrically such that a far-field scattering pattern of the light emitted by the nanoantenna 100 is not symmetric with respect to the normal direction. Photons of the scattered light thus also have a mean wavevector $\vec{k}_L$ that is non-zero. The nanoantenna 100A is configured to scatter left-circularly polarized light such that the in-plane wavevector $\vec{k}_L$ of the scattered photons is substantially anti-parallel to the in-plane wavevector $\vec{k}_R$ of the scattered photons for right-circularly polarized light. Thereby, a direction of the force acting on the nanoantenna 100A may be reversed by inverting the polarization of the incident light. The nanoantenna 100A may in particular be configured to scatter left- and right-circularly polarized light such that the magnitudes of the in-plane wavevectors $\vec{k}_L$ and $\vec{k}_R$ are substantially equal, i.e. such that a momentum of substantially equal magnitude is transferred to the nanoantenna 100A by each scattered photon for both left- and right-circularly polarized light.

In contrast, the nanoantenna 100B of the second type shown in FIG. 1*d* is configured to scatter circularly polarized light at its resonance wavelength that is incident along the normal direction and has the opposite circular polarization $\bar{j}$ (with $\bar{j}$=L in the example of FIG. 1*d*) symmetrically such that a far-field scattering pattern of the light emitted by the nanoantenna 100 is substantially symmetric with respect to the normal direction, e.g. such that $I_{out}(\theta, \varphi)$ and $I_{out}(\theta, \varphi+\pi)$ are substantially equal and/or such that $I_{out}(\theta, \varphi)$ and $I_{out}(\pi-\theta, \varphi+\pi)$ are substantially equal (i.e. such that the far-field scattering pattern is rotationally symmetric around the normal direction and/or inversion symmetric with respect to the origin). Photons of the scattered light thus have a mean wavevector $\vec{k}_L$ that is substantially zero such that no net force on the nanoantenna 100B is generated for left-circularly polarized light. Thereby, a force acting on the nanoantenna 100B may be switched on and off by inverting the polarization of the incident light.

FIGS. 2*a* and 2*b* show schematic illustrations (not to scale) of a nanodrone 200 according to an exemplary embodiment of the invention in top view, wherein the nanodrone 200 is illuminated using a first illumination scheme in FIG. 2*a* and using a second illumination scheme in FIG. 2*b*.

The nanodrone 200 comprises a substrate 202 that extends perpendicular to the normal direction, which may for example be anti-parallel to the direction of view of FIGS. 2*a* and 2*b*. Preferably, at least a part of the substrate 202 or the entire substrate 202 is optically transparent. The substrate 202 may for example comprise or consist of glass and/or a transparent polymer material such as a transparent thermoplastic material. Preferably, the substrate 202 comprises or consists of a material that is suitable for fabrication by photolithography and/or electron beam lithography and/or 3D nanoprinting, e.g. a photoresist and/or an electron beam resist. The substrate 202 may for example comprise or consist of hydrogen silsesquioxane (HSQ), poly(methyl methacrylate) (PMMA), silicon dioxide ($SiO_2$), SU-8 photoresist, a two-photon polymerization resin, polyphalaldehyde (PPA), and/or an AR-N series resist as sold by ALL-RESIST GmbH. The substrate 202 may for example be a circular slab with substantially flat surfaces as in the example of FIGS. 2*a*, 2*b*, wherein a diameter of the substrate 202 in the XY plane may for example be between 0.5 μm and 100 μm, in some examples between 1 μm and 10 μm. A thickness of the substrate 202 along the normal direction may for example be between 20 nm and 10 μm, in some examples between 50 nm and 1 μm.

The nanodrone 200 further comprises a pair of nanoantennas 100-1 and 100-2, which are referred to as the first nanoantenna 100-1 and the second nanoantenna 100-2, respectively, in the following. In the example of FIGS. 2*a*, 2*b*, the first and second nanoantennas 100-1, 100-2 are nanoantennas of the first type such as the nanoantenna 100A of FIG. 1*c*, i.e. the in-plane wavevectors $\vec{k}_{i,L}$ and $\vec{k}_{i,R}$ of the scattered photons for left- and right-circularly polarized light, respectively, may be substantially anti-parallel to each other for both the first nanoantenna 100-1 (i=1) and the second nanoantenna 100-2 (i=2). In other examples, one or both of the nanoantennas 100-1, 100-2 may also be nanoantennas of the second type such as the nanoantenna 100B of FIG. 1*d*.

The first and second nanoantennas 100-1, 100-2 are arranged on and/or in the substrate 202 and are arranged symmetrically with respect to a center of mass 204 of the nanodrone 200, i.e. such that the center of mass 204 lies half way along a connection vector connecting a center of the first nanoantenna 100-1 with a center of the second nanoantenna 100-2. The first and second nanoantennas 100-1, 100-2 are oriented such that the in-plane wavevectors $\vec{k}_{1,L}$ and $\vec{k}_{2,R}$ are substantially parallel as shown in FIG. 2*a*, whereas the in-plane wavevectors $\vec{k}_{1,L}$ and $\vec{k}_{2,L}$ are substantially anti-parallel as shown in FIG. 2*b*. Furthermore, each of the first and second nanoantennas 100-1, 100-2 is oriented such that the in-plane wavevectors $\vec{k}_{L,1}$, $\vec{k}_{R,1}$, $\vec{k}_{L,2}$ and $\vec{k}_{R,2}$ of the scattered light are substantially perpendicular to the connection vector connecting the centers of the first and second nanoantennas 100-1, 100-2 for both left- and right-circularly polarized light.

The first and second nanoantennas 100-1, 100-2 may have different resonance wavelengths, wherein the difference between the resonance wavelengths may for example be between 50 nm and 500 nm, preferably between 100 nm and 300 nm. This allows for selectively addressing either the first nanoantenna 100-1 or the second nanoantenna 100-2 using light at the respective resonance wavelengths without having to focus the light onto the respective nanoantenna.

In the example of FIG. 2*a*, the nanodrone 200 is illuminated along the normal direction with left-circularly polarized light at the resonance wavelength of the first nanoantenna 100-1 ($j_1$=L) and right-circularly polarized light at the resonance wavelength of the second nanoantenna 100-2 ($j_2$=R). In this case, the in-plane wavevectors of the photons scattered by the first and second nanoantennas 100-1, 100-2 both point along the negative X direction of FIG. 2*a*, thereby generating a force F on the nanodrone 200 pointing along the X direction. The intensities of the light at the resonance wavelength of the first nanoantenna 100-1 and of the light at the resonance wavelength of the second nanoantenna 100-2 may be balanced such that the in-plane force imparted on the respective nanoantenna by the scattered light (which is proportional to a sum over the in-plane wavevectors of all photons scattered by the respective nanoantenna) has substantially the same magnitude for both nanoantennas 100-1, 100-2. In this case, the torque generated by the two nanoantennas 100-1, 100-2 cancels such that only a force F, but no net torque is generated. In this way, the nanodrone 200 may be moved along the X direction, wherein the direction of motion may be reversed by inverting the polarization of the light at both the resonance wavelength of the first nanoantenna 100-1 and at the resonance wavelength of the second nanoantenna 100-2 (i.e. $j_1$=R and $j_2$=L).

In the example of FIG. 2*b*, the nanodrone 200 is illuminated along the normal direction with left-circularly polarized light at both resonance wavelengths ($j_1$=L and $j_2$=L), i.e. the polarization of the light at the resonance wavelength of the second nanoantenna 100-2 is inverted with respect to the illumination scheme of FIG. 2*a*. Thereby, the in-plane wavevector of the photons scattered by the second nanoantenna 100-2 and thus the force generated by the second nanoantenna 100-2 is reversed such that a torque M acting on the nanodrone 200 is generated instead of the force F as in FIG. 2*a*, wherein the torque M is collinear with the normal direction. In this way, the nanodrone 200 may be rotated around the normal direction, wherein the direction of rotation may be reversed by inverting the polarization of the light at both the resonance wavelength of the first nanoantenna 100-1 and at the resonance wavelength of the second nanoantenna 100-2 (i.e. $j_1$=R and $j_2$=R).

FIGS. 3*a* and 3*b* show schematic illustrations (not to scale) of nanoantennas 300A and 300B, respectively, according to exemplary embodiments of the invention in top view. The nanoantenna 300A is a nanoantenna of the first type similar to the nanoantenna 100A of FIG. 1*c*, whereas the nanoantenna 300B is a nanoantenna of the second type similar to the nanoantenna 100B of FIG. 1*d*.

Each of the nanoantennas 300A, 300B comprises a plurality of electrically conductive structures, e.g. three electrically conductive structures 302-1, 302-2 and 302-3 as in the examples of FIGS. 3*a*, 3*b*. Each of the electrically conductive structures 302-1 to 302-3 may for example comprise or consist of a metal such as gold, silver, aluminum, and/or copper. In other embodiments, some or all of the structures 302-1, 302-2 and 302-3 may also be dielectric or semiconducting structures and may e.g. comprise or consist of a transparent material such as glass. Each of the electrically conductive structures 302-1 to 302-3 forms a resonator for one or more excitation modes such as a plasmon mode or a phonon mode, wherein the excitation mode couples to light, e.g. via an electric dipole moment and/or a magnetic dipole moment. The excitation mode may thus be excited by absorption of one or more photons and may decay by emission of one or more photons, thereby giving rise to one or more optically addressable resonances. The electrically conductive structures 302-1 to 302-3 may thus also be referred to as resonators. Each of the resonators 302-1, 302-2 and 302-3 may have a resonator axis 304-1, 304-2 and 304-3, respectively, wherein the resonator axis of a resonator may for example be aligned with a direction of the electric dipole moment and/or the magnetic dipole moment associated with the respective excitation mode, which may for example correspond to a longitudinal axis of the respective resonator.

In the examples of FIGS. 3*a*, 3*b*, each of the resonators 302-1 to 302-3 of the nanoantennas 300A, 300B is a rectangular rod. The resonance wavelength of each of the resonators 302-1 to 302-3 may for example be tuned by adjusting the physical dimensions of the respective resonator such as its length I and/or its width w. The length l of the resonators 302-1 to 302-3 may for example be on the order of 50 nm to 2 μm, in some examples between 100 nm and 400 nm. The width w of the resonators 302-1 to 302-3 may for example be on the order of 10 nm to 500 nm, in some examples between 20 nm and 100 nm. The height of the resonators 302-1 to 302-3 along the normal direction may for example be on the order of 10 nm to 500 nm, in some examples between 20 nm and 100 nm. The resonators 302-1 to 302-3 of a given nanoantenna, e.g. the nanoantenna 300A, may have a similar shape and/or a similar resonance wavelength. For example, the widths w and/or the lengths I of the resonators 302-1 to 302-3 of the respective nanoantenna may differ by less than 50%. Preferably, the resonators 302-1 to 302-3 of the respective nanoantenna have substantially the same shape and/or the same resonance wavelength. For example, the widths w and/or the lengths l of the resonators 302-1 to 302-3 of the respective nanoantenna may differ by less than 20%, in some examples by less than 10%, in one example by less than 5%. The resonance wavelengths of the resonators 302-1 to 302-3 of the respective nanoantenna may for example differ by less than 300 nm, preferably by less than 200 nm, in some examples by less than 50 nm, in one example by less than 10 nm.

In the example of FIG. 3*a*, the resonators 302-1 to 302-3 of the nanoantenna 300A are arranged in a U-shaped configuration, wherein the first resonator 302-1 and the third resonator 302-3 are arranged adjacent to opposite ends of the second resonator 302-2, e.g. such that corners of the respective resonators face each other and are separated by a distance d. The first and third resonators 302-1, 302-3 are arranged substantially parallel to each other and substantially perpendicular to the second resonator 302-2, e.g. such that the resonator axes 304-1, 304-3 are substantially parallel to each other and substantially perpendicular to the resonator axis 304-2. The distance d may be chosen to be sufficiently small such that the excitation modes in the resonators 302-1 to 302-3 are coupled with each other, e.g. via evanescent fields leaking out of the resonators 302-1 to 302-3 and/or via electric and/or magnetic fields generated by charge accumulations within the resonators 302-1 to 302-3. The distance d may for example be between 2 nm and 100 nm, in some examples between 4 nm and 50 nm. Preferably, the coupling strength between adjacent resonators is larger than the detuning of the respective resonators, i.e. the difference between the resonance wavelengths of the respective resonators, such that the coupling between the resonators 302-1 to 302-3 gives rise to common modes corresponding to superpositions of the modes of the individual resonators 302-1 to 302-3. The coupling strength may for example be at least two times as large, preferably at least 5 times as large as the detuning.

In the example of FIG. 3*b*, the resonators 302-1 to 302-3 of the nanoantenna 300B are arranged in an F-shaped configuration. The first resonator 302-1 is arranged adjacent to a first end of the second resonator 302-2, e.g. such that corners of the respective resonators face each other and are separated by the distance d similar to the corresponding resonators of the nanoantenna 300A. The distance d may be chosen to be sufficiently small such that the excitation modes in the first and second resonators 302-1, 302-2 are coupled with each other.

The third resonator 302-3 is arranged on a side of the first resonator 302-1 facing away from the second resonator 302-2, e.g. such that the first resonator 302-1 is arranged between the first end of the second resonator 302-2 and the third resonator 302-3. A distance $d_3$ between the first resonator 302-1 and the third resonator 302-3 may be chosen to be sufficiently large such that modes of the first and third resonators 302-1, 302-3 are not coupled to each other via evanescent fields. Similar to the configuration of FIG. 3*a*, the first and third resonators 302-1, 302-3 are substantially parallel to each other and substantially perpendicular to the second resonator 302-2. The first and second resonators 302-1, 302-2 may have substantially the same shape and/or the same resonance wavelength, e.g. similar to the nanoantenna 300A. The third resonator 302-3 may be slightly smaller than the first resonator 302-1, e.g. such that the resonance wavelength of the third resonator 302-3 is slightly smaller than the resonance wavelength of the first resonator 302-1 A length $l_3$ of the third resonator 302-3 may for example be between 70% and 95%, in some examples between 85% and 95% of the length L of the first resonator 302-1. A resonance wavelength of the third resonator 302-3 may for example be between 10 nm and 300 nm, in some examples between 50 nm and 200 nm smaller than the resonance wavelength of the first resonator 302-1.

FIG. 4 depicts numerically simulated emission characteristics of a U-type nanoantenna (Type I) such as the nanoantenna 300A of FIG. 3*a* and of an F-type nanoantenna (Type II) such as the nanoantenna 300B of FIG. 3*b* to illustrate the working principles of the respective types of nanoantennas.

Panel a shows results for illumination by left-circularly polarized light (clockwise, CW) in the upper row and for illumination by right-circularly polarized light (counter-clockwise, CCW) in the lower row. The left column shows the emission characteristics of a U-type nanoantenna and the right column shows the emission characteristics of an F-type nanoantenna, wherein the center column shows the emissions characteristics of a nanoantenna comprising a pair of coupled resonators in an L-shaped configuration such as the resonators 302-1 and 302-2. Subplots on the left side of each column depict the numerically simulated near-field intensity distribution of the illuminated nanoantennas, whereas subplots on the right side of each column depict the numerically simulated far-field intensity distribution of the light scattered by the nanoantennas with the arrows indicating the force on the nanoantenna generated by the scattered light.

The coupling between two substantially perpendicular resonators such as the resonators 302-1 and 302-2 may give rise to common modes corresponding to symmetric and antisymmetric superpositions of the modes in the individual resonators. Illumination by circularly polarized light may in turn excite a symmetric or antisymmetric superposition of the common modes, thereby leading to a localized excitation of only one of the resonators as shown in the left subplots of the center column of panel a. Each of the resonators may have a dipole-like emission characteristic with light being predominantly emitted in directions perpendicular to the respective resonator axes. As the two resonators are arranged at an angle to each other, the response of the nanoantenna is chiral, i.e. the nanoantenna exhibits different intensity distributions of the emitted light for illumination with left- and right-circularly polarized light as shown in the right subplots of the center column of panel a.

The third resonator 302-3 may act as a reflector or directing element that breaks the inversion symmetry of the emitted intensity distribution, thereby giving rise to a non-zero inplane wavevector of the scattered photons and thus a non-zero in-plane force on the nanoantenna. In other embodiments, a reflecting and/or absorbing element may be provided instead of or in addition to the third resonator 302-3 to break the inversion symmetry, e.g. a structure that is configured to absorb light emitted by the first and/or second resonators 302-1, 302-2 in one direction, e.g. the X direction of FIGS. 3*a*, 3*b*, at least in part.

In an F-type nanoantenna, for example as shown in the right column of panel a, the distance $d_3$ between the first and third resonators 302-1, 302-3 and/or the resonance wavelength of the third resonator 302-3 may be chosen such that the light emitted by the first and third resonators 302-1, 302-3 interferes constructively in a first direction, e.g. the negative X direction of FIG. 3*b*, and destructively in a second direction opposite to the first direction, e.g. the X direction of FIG. 3*b*. When illuminating the nanoantenna such that the first resonator 302-1 is excited (left-circular polarization in the example of FIG. 4), the nanoantenna may thus predominantly scatter light in the first direction such that a force is generated in the opposite direction. In contrast, when the nanoantenna is illuminated such that the second resonator 302-2 is excited (right-circular polarization in the example of FIG. 4), the dipole-like emission characteristic of the second and third resonators 302-2, 302-3 may lead to a substantially inversion-symmetric intensity distribution of the scattered light such that the force on the nanoantenna is substantially zero.

In a U-type nanoantenna as shown in the left column of panel a, the coupling between the three resonators 302-1 to 302-3 may give rise to common modes corresponding to superpositions of modes from each of the three resonators. Illumination with circularly polarized light may excite a superposition of the common modes that is predominantly localized on either the first resonator 302-1 or the third resonator 302-3. Interference between light emitted by the first and third resonators 302-1, 302-3 may lead to an asymmetric intensity distribution of the emitted light for both circular polarizations, wherein the in-plane wavevectors and thus the generated forces are substantially anti-parallel for left- and right-circularly polarized light. Due to the second resonator 302-2 being arranged adjacent to upper ends of the first and third resonators 302-1, 302-3 along the Y axis, the in-plane wavevectors for left- and right-circularly polarized light may not be perfectly anti-parallel, but may for example be at an angle between 150° and 210°, in some examples between 160° and 200°, preferably between 170° and 190° to each other.

Panels b and c show the numerically simulated magnitude of the force generated on U-type and F-type nanoantennas, respectively, by illumination with circularly polarized light. For both types of nanoantennas, results are shown for two nanoantennas with different resonance wavelengths (solid line/dotted line: 830 nm and dashed line/dashed-dotted line: 980 nm), wherein the different resonance wavelengths were obtained by adjusting the dimensions of the resonators such as the lengths l and the widths w appropriately.

Each of the nanoantennas exhibits a pronounced resonance peak at the respective resonance wavelength, where the force on the nanoantenna is largest. The difference between the resonance wavelengths of the U-type nanoantennas in panel b is chosen such that the force on the smaller nanoantenna with the resonance wavelength of 830 nm exhibits a zero-crossing at the resonance wavelength of the larger nanoantenna of 980 nm. The force on the U-type nanoantennas in panel b may be substantially equal in magnitude for both circular polarizations. The response of the nanoantennas is thus only shown for a single polarization in panel b for illustration purposes.

In panel c, the response of the F-type nanoantennas is shown for both circular polarizations. For an orientation of the nanoantennas as shown in FIG. 3*b*, a non-zero force is generated for illumination with left-circularly polarized light, whereas the force is substantially zero for illumination with right-circularly polarized light. In contrast, an inverted configuration (i.e. a "mirror image" of the nanoantenna as shown in FIG. 3*b*) may exhibit the opposite response, i.e. a non-zero force is generated for illumination with right-circularly polarized light, whereas the force is substantially zero for illumination with left-circularly polarized light.

FIG. 5*a* depicts a schematic illustration (not to scale) of a nanodrone 500A in accordance with an exemplary embodiment of the invention in top view. Similar to the nanodrone 200 of FIGS. 2*a*, 2*b*, the nanodrone 500A comprises a substrate 202 as well as a pair of nanoantennas 300A-1, 300A-2 arranged on and/or in the substrate 202. The substrate 202 is a circular slab, wherein a reference feature such as a notch 502 is arranged along a circumference of the substrate 202, e.g. for determining an orientation of the nanodrone 500A.

Each of the nanoantennas 300A-1, 300A-2 is a U-type nanoantenna comprising three coupled resonators similar to the nanoantenna 300A of FIG. 3*a*. The nanoantennas 300A-1, 300A-2 are inversion-symmetric with respect to the center of mass 204 of the nanodrone 500A (corresponding to a two-fold rotational symmetry about the normal direction), i.e. the nanoantennas 300A-1, 300A-2 are mirror images of each other and arranged on opposite sides of the center of mass 204 at the same distance from the center of mass 204. The nanoantennas 300A-1, 300A-2 may have different resonance wavelengths. For example, the length I of the resonators of the first nanoantenna 300A-1 may be smaller than the length of the resonators of the second nanoantenna 300A-2 or vice-versa (not shown). The width w of the resonators of the nanoantennas 300A-1, 300A-2 may be chosen such that both nanoantennas 300A-1, 300A-2 have the same mass, e.g. such that the width w of the resonators of the first nanoantenna 300A-1 is larger than the width of the resonators of the second nanoantenna 300A-2 if the length l of the resonators of the first nanoantenna 300A-1 is smaller than the length of the resonators of the second nanoantenna 300A-2 or vice-versa.

FIG. 5*b* depicts a schematic illustration (not to scale) of a nanodrone 500B in accordance with another exemplary embodiment of the invention in top view. Similar to the nanodrone 500A of FIG. 5*a*, the nanodrone 500B also comprises a substrate 202 with a notch 502. Instead of the pair of U-type nanoantennas 300A-1, 300A-2, the nanodrone 500B comprises four F-type nanoantennas 300B-1, 300B-2, 300B-3 and 300B-4, each comprising a pair of coupled resonators and a third resonator similar to the nanoantenna 300B of FIG. 3*b*.

The four nanoantennas 300B-1 to 300B-4 are arranged such that the arrangement is inversion-symmetric with respect to the center of mass 204 of the nanodrone 500B and possesses mirror symmetries with respect to planes of symmetry that are parallel to the XZ and XY planes, respectively, and contain the center of mass 204. In other words, the third and fourth nanoantennas 300B-3, 300B-4 are mirror images of the first nanoantenna 300B-1 with the second nanoantenna 300B-2 corresponding to a copy of the first nanoantenna 300B-1 rotated by 180°. In such an arrangement, a first pair of nanoantennas, namely the first and second nanoantennas 300B-1, 300B-2, may scatter circularly polarized light at the respective resonance wavelengths incident along the normal direction such that the mean wavevector $\vec{k}_{i,j}$ for a polarization j (e.g. left-circular polarization j=L) is non-zero and $\vec{k}_{i,\bar{j}}$ for the opposite polarization $\bar{j}$ (e.g. right-circular polarization) is substantially zero. A second pair of nanoantennas, namely the third and fourth nanoantennas 300B-3, 300B-4, may scatter circularly polarized light at the respective resonance wavelengths incident along the normal direction such that the mean wavevector $\vec{k}_{i,j}$ for the polarization j (e.g. left-circular polarization j=L) is substantially zero and $\vec{k}_{i,\bar{j}}$ for the opposite polarization $\vec{j}$ (e.g. right-circular polarization) is non-zero. The first and second pairs of nanoantennas may thus be addressed selectively by choosing the polarization of the incident light accordingly, e.g. as detailed below with reference to FIG. 6. Furthermore, each of the nanoantennas 300B-1 to 300B-4 is arranged at the same distance from the center of mass 204, i.e. such that the nanoantennas 300B-1 to 300B-4 lie on a concentric circle around the center of mass 204. The nanoantennas 300B-1 to 300B-4 may be distributed equally around the concentric circle, e.g. such that adjacent nanoantennas are separated by 90°.

A third pair of nanoantennas, for example the first and third nanoantennas 300B-1, 300B-3, may have the same resonance wavelength and a fourth pair of nanoantennas, for example the second and fourth nanoantennas 300B-2, 300B-4, may have the same resonance wavelength with the resonance wavelength of the fourth pair of nanoantennas being different from the resonance wavelength of the third pair of nanoantennas. The third and fourth pairs of nanoantennas may thus be addressed selectively by choosing the wavelength of the incident light accordingly. In combination with the polarization dependence of the mean wavevector of the scattered photons, this allows for selectively addressing each of the nanoantennas individually by an appropriate choice of the polarization and the wavelength of the incident light, e.g. as detailed below with reference to FIG. 6. In other embodiments, a different arrangement of nanoantennas 300B-1 to 300B-4 and different resonance wavelengths may be chosen, e.g. such that the first and third nanoantennas 300B-1, 300B-3 may be addressed with the same polarization, but may have different resonance wavelengths and the second and fourth nanoantennas 300B-2, 300B-4 may be addressed with the same polarization, but may have different resonance wavelengths.

FIG. 6 schematically illustrates how the basic motional degrees of freedom of the nanodrone 500A of FIG. 5*a* (upper row) and of the nanodrone 500B of FIG. 5*b* (lower row) can be controlled using a pair of circularly polarized beams of light at the respective resonance wavelengths.

The first nanoantenna 300A-1 of the nanodrone 500A is oriented such that—in the orientation of the nanodrone 500A as shown in FIGS. 5*a* and 6—the in-plane wavevector of the scattered photons is substantially parallel to the Y direction of FIG. 5*a* for illumination with right-circularly polarized light and substantially anti-parallel to the Y axis of FIG. 5*a* for illumination with left-circularly polarized light. In contrast, the second nanoantenna 300A-2 of the nanodrone 500A is oriented such that—in the orientation of the nanodrone 500A as shown in FIGS. 5*a* and 6—the in-plane wavevector of the scattered photons is substantially anti-parallel to the Y direction of FIG. 5*a* for illumination with right-circularly polarized light and substantially parallel to the Y axis of FIG. 5*a* for illumination with left-circularly polarized light.

For the nanodrone 500A, a torque that is substantially parallel or anti-parallel to the normal direction may thus be generated by illuminating the nanodrone 500A with right- and left-circularly polarized light, respectively, at both resonance wavelengths (leftmost and rightmost panels in the upper row of FIG. 6). A force that is substantially perpendicular to the connection vector between the first and second nanoantennas 300A-1, 300A-2 (i.e. collinear with the Y axis for an orientation of the nanodrone 500A as shown in FIG. 5*a*) may be generated by illuminating the nanodrone 500A with right-circularly polarized light at one resonance wavelength and left-circularly polarized light at the other resonance wavelength, wherein the direction of the force may be reversed by inverting the circular polarizations (central panels in the upper row of FIG. 6). In this way, two motional degrees of freedom (rotation around the normal direction and translation in one direction perpendicular to the normal direction) can be controlled independently.

The nanoantennas 300B-1 to 300B-4 of the nanodrone 500B—for which the inplane wavevector of the scattered photons is non-zero for one circular polarization, but substantially zero for the opposite circular polarization—are arranged such that the in-plane wavevectors for the first and second nanoantennas 300B-1, 300B-2 (first pair of nanoantennas) are non-zero and substantially anti-parallel for illumination with left-circularly polarized light (see e.g. the second panel from the left in the lower row of FIG. 6), whereas the in-plane wavevectors for the third and fourth nanoantennas 300B-3, 300B-4 (second pair of nanoantennas) are non-zero and substantially anti-parallel for illumination with right-circularly polarized light (see e.g. the second panel from the right in the lower row of FIG. 6). Furthermore, the nanoantennas 300B-1 to 300B-4 are oriented such that the non-zero in-plane wavevectors are substantially perpendicular to a connection vector between the center of mass 204 and the respective nanoantenna, i.e. substantially tangential to a concentric circle around the center of mass 204 on which the nanoantennas 300B-1 to 300B-4 are arranged.

For the nanodrone 500B, a torque that is substantially parallel or anti-parallel to the normal direction may thus be generated in the same way as for the nanodrone 500A, i.e. by illuminating the nanodrone 500B with right- and left-circularly polarized light, respectively, at both resonance wavelengths (second panel from the left and second panel from the right in the lower row of FIG. 6). A force in a first direction that is substantially perpendicular to the connection vector between the first and fourth nanoantennas 300B-1, 300B-4 (i.e. collinear with the X axis for an orientation of the nanodrone 500B as shown in FIG. 5*b*) may be generated by illuminating the nanodrone 500B with right-circularly polarized light at one resonance wavelength and left-circularly polarized light at the other resonance wavelength, wherein the direction of the force may be reversed by inverting the circular polarizations (central panels in the lower row of FIG. 6). A force in a second direction that is substantially perpendicular to the connection vector between the first and third nanoantennas 300B-1, 300B-3 and thus substantially perpendicular to the first direction (i.e. collinear with the Y axis for an orientation of the nanodrone 500B as shown in FIG. 5*b*) may be generated by illuminating the nanodrone 500B simultaneously with left- and right-circularly polarized light, e.g. linearly polarized light, at one of the resonance wavelengths (e.g. the resonance wavelength of the third pair of nanoantennas formed by the first and third nanoantennas 300B-1, 300B-3, rightmost panel in the lower row of FIG. 6, or at the resonance wavelength of the fourth pair of nanoantennas formed by the second and fourth nanoantennas 300B-2, 300B-4, leftmost panel in the lower row of FIG. 6), wherein the direction of the force may be reversed by changing to the other resonance wavelength. In this way, all three motional degrees of freedom in two dimensions (rotation around the normal direction and translation in two orthogonal directions perpendicular to the normal direction) can be controlled independently.

FIG. 7 shows a schematic illustration (not to scale) of a system 700 for operating a nanodrone according to an exemplary embodiment of the invention in side view. The system 700 may be used for operating a nanodrone according to any one of the embodiments described herein, e.g. the nanodrone 200 of FIGS. 2*a*, 2*b* as illustrated in FIG. 7, which is used as a non-limiting example for illustration purposes in the following. The system 700 may for example be configured to operate a nanodrone by executing the method 800 of FIG. 8 at least in part.

The system 700 comprises an illumination system 702, which is configured to generate polarized light at two wavelengths, e.g. at the resonance wavelengths of the pair of nanoantennas 100-1, 100-2 of the nanodrone 200. For this, the illumination system 702 comprises a pair of light sources 704A, 704B, e.g. a pair of lasers, each of which is configured to generate light at a respective one of the two wavelengths and associated with a respective optical path in the system 700. The light generated by the light sources 704A, 704B may already be polarized, e.g. linearly polarized, or may be polarized subsequently using a polarizer (not shown) along the respective optical path. The light generated by the light sources 704A, 704B may be overlapped and coupled into a common optical path using a dichroic mirror 710B.

The illumination system 702 is further configured to adjust a polarization and an intensity of the light at the two wavelengths. Each of the light sources 704A, 704B may for example be configured to adjust an output power of the generated light. Additionally or alternatively, the illumination system 702 may comprise means for adjusting the intensity of the light propagating along the respective optical path, for example an acousto-optic modulator or a wave plate in combination with a polarizer. The illumination system further comprises a half-wave plate (λ/2 wave plate) 706A, 706B in the optical path for each of the light sources 704A, 704B, which is configured to rotate a linear polarization of the light propagating along the respective optical path. The illumination system 702 further comprises a quarter-wave plate (λ/4 wave plate) 712 in the common optical path, which is configured to convert a linear polarization—depending on its orientation relative to the slow and fast axes of the quarter-wave plate—to an elliptical polarization and in particular a circular polarization.

The system 700 further comprises an imaging system for imaging the nanodrone 200. In the example of FIG. 7, the imaging system is a microscope comprising an objective 714 and a photodetector 716, wherein the objective 714 may e.g. be a high-NA objective, in particular a water or oil immersion objective, and may be configured to image a plane in which the nanodrone 200 is to be operated onto the photodetector 716. The photodetector may for example be a CCD or CMOS chip that is configured to record spatially resolved images. The illumination system 702 may comprise a lens 708A, 708B in the optical path for each of the light sources 704A, 704B, for example to focus the light propagating along the respective optical path in a back focal plane of the objective 714, e.g. such that the respective beam is collimated in a front focal plane of the objective 714, which may coincide with the plane in which the nanodrone 200 is to operated. A diameter of the illumination beams in the front focal plane of the objective 714 may for example be between 20 μm and 500 μm, e.g. such that the entire nanodrone 200 is illuminated homogeneously. The illumination system 702 may further comprise a dichroic mirror 710A for combining an optical path from the light source 704A with an optical path of the imaging system.

While the illumination system 702 and the imaging system of the system 700 are both configured to illuminate and image, respectively, the nanodrone 200 from above, one or both subsystems may also be arranged differently. For example, the imaging system may be arranged below the nanodrone 200 to image the nanodrone from below. In some embodiments, the illumination system 702 may be configured to illuminate the nanodrone with two pairs of counter-propagating beams (not shown), wherein each pair comprises a beam at each of the two wavelengths. One pair of beams may for example illuminate the nanodrone 200 from above, whereas the other pair of beams may illuminate the nanodrone 200 from below.

The system 700 further comprises a controller 718, which may be implemented in hardware, software or a combination thereof. The controller 718 may comprise a processor, e.g. a central processing unit (CPU), a graphics processing unit (GPU), an application specific integrated circuit (ASIC) and/or a field-programmable gate array (FPGA), and a storage medium, e.g. a non-volatile memory and/or a volatile memory, containing instructions for execution by the processor to provide the functionality described herein. The controller 718 is configured to control the illumination system 702 as well as the imaging system of the system 700. The controller 718 is in particular configured to operate the nanodrone 200 using the illumination system 702 and the imaging system. For this, the controller 718 may be configured to execute some or all of the steps of the method 800 described below with reference to FIG. 8.

The system 700 further comprises a chamber or a well 720 that the nanodrone 200 may be operated in. The well 720 may for example be arranged in or on an optically transparent substrate such as a glass plate or a microfluidic chip (not shown). The well 720 is configured to hold a liquid 722 such as water or an aqueous solution that the nanodrone 200 is to be operated in. A composition of the liquid 722 may be chosen such that surface charges of equal polarity are generated on the nanodrone 200 and a bottom surface 720A of the well 720 above which the nanodrone 200 is to be operated. Thereby, a repulsive electrostatic force may be generated between the nanodrone 200 and the bottom surface 720A to prevent the nanodrone 200 from coming in contact with the bottom surface 720A as a result of the light pressure generated by the light illuminating the nanodrone 200.

FIG. 8 shows a flow chart of a method 800 of operating a nanodrone according to an exemplary embodiment of the invention. The method 800 may be used for operating a nanodrone according to any one of the embodiments described herein, for example the nanodrone 500B of FIG. 5*b*. The method 800 may be executed using a system for operating a nanodrone according to any one of the embodiments disclosed herein, for example the system 700 of FIG. 7. In particular, some or all of the steps of method 800 may be executed by a controller of a system for operating a nanodrone according to any one of the embodiments described herein such as the controller 718 of the system 700 of FIG. 7. The nanodrone 500B, the system 700 and the controller 718 will be used as non-limiting examples for illustration purposes in the following. The method 800 is not limited to the order of execution shown in the flow chart of FIG. 8. As far as technically feasible, the method 800 may be executed in an arbitrary order and parts thereof may be executed simultaneously at least in part. For example, step 804 may be executed prior to step 802 in some embodiments. Furthermore, some or all of the steps of method 800 may be executed repeatedly, for example steps 804 to 808 for moving the nanodrone along a path specified by the motion command obtained in step 802.

Prior to execution of the method 800 or as part of the method 800, a nanodrone such as the nanodrone 500B may be provided. The nanodrone 500B may in particular be provided along with a bottom surface 720A above which the nanodrone 500B is to be operated, e.g. by providing a chamber or a well such as the well 720. This may comprise providing the liquid 722, which may for example be water, in the well 720. Small amounts of sodium dodecyl sulfate, e.g. at a molar concentration between 1 mM and 20 mM, for example 10 mM, and of sodium chloride, e.g. at a molar concentration between 0.5 mM and 10 mM, for example 5 mM, may be added to the liquid 722 to generate electric surface charges of the same polarity on the nanodrone 500B and the bottom surface 720A such that a repulsive electrostatic force acts on the bottom surface 720A and the nanodrone 500B.

In step 802, a motion command is obtained, e.g. by the controller 718, wherein the motion command specifies a movement that is to be performed with the nanodrone 500B. The motion command may for example specify a direction and a distance for a linear translation of the nanodrone 500B and/or a direction and an angle for a rotation of the nanodrone 500B. The motion command may in particular specify a path along which the nanodrone 500B is to be moved, which may e.g. comprise a plurality of linear as well as curved segments.

In step 804, an image of the nanodrone 500B in the well 720 is taken using the imaging system of the system 700 and provided to the controller 718. The controller 718 determines an orientation of the nanodrone 500B, for example by determining the position of the center of mass 204 and the position of the notch 502 in the image. The controller 718 may for example determine an azimuthal angle of the vector connecting the center of mass 204 and the notch 502 relative to the normal direction along which the nanodrone 500B is illuminated by the illumination system 702. In some examples, the image of the nanodrone 500B may be taken while illuminating the nanodrone in step 808, e.g. using the light generated by illumination system 702 and in particular the light used for moving the nanodrone 500B.

In step 806, the controller 718 determines polarizations and intensities for the light with which the nanodrone 500B is to be illuminated for executing the motion command, e.g. a polarization and an intensity for the light at each of the resonance wavelengths of the nanoantennas 300B-1 to 300B-4. The controller 718 may for example determine the Stokes parameters $S_0$ and $S_3$ for the light at the resonance wavelength of the first and third nanoantennas 300B-1, 300B-3 and for the light at the resonance wavelength of the second and fourth nanoantennas 300B-2, 300B-4. This may comprise transforming the motion command into the reference frame of the nanodrone 500B for the orientation of the nanodrone 500B determined in step 804, e.g. by performing a corresponding rotation around the normal direction.

In step 808, the nanodrone 718 is illuminated along the normal direction with light at one or more resonance wavelengths of the nanoantennas 300B-1 to 300B-4 with the polarizations and intensities determined in step 806 using the illumination system 702 to perform the movement specified by the motion command. This may comprise adjusting one or more of the wave plates 706A, 706B and 712 accordingly to generate light with the desired polarizations at the respective resonance wavelengths. This may further comprise adjusting the output power of the light sources 704A, 704B and/or an optical power along the respective optical path, e.g. using an acousto-optic modulator, to generate light with the desired intensities at the respective resonance wavelengths.

The polarizations of the light at the respective resonance wavelengths are chosen such that the linear momenta transferred to the nanodrone 500B by the light scattered by the nanoantennas 300B-1 to 300B-4 as a result of the non-zero in-plane wavevectors $\vec{k}_{i,j_i}$ generate a force acting on the nanodrone 500B that is substantially perpendicular to the normal direction and/or a torque acting on the nanodrone 500B that is substantially collinear with the normal direction to perform the movement specified by the motion command, e.g. as detailed above with reference to FIGS. 2*a*, 2*b* and 6. In addition to the force generated by the scattered light, which is substantially perpendicular to the normal direction, the incident light illuminating the nanodrone 500B may also generate a light pressure on the nanodrone 500B, i.e. an additional force along the direction of incidence, which is substantially parallel to the normal direction. In some embodiments, the light pressure may be compensated by a counter-acting force at least in part, e.g. by additional illumination along the opposite direction and/or by a repulsive force between the nanodrone 500B and the bottom surface 720A of the well 720.

Steps 804 to 808 may be executed repeatedly, e.g. to move the nanodrone 500B along a path or to a position specified by the motion command and/or to continuously monitor the orientation of the nanodrone 500B to adjust the polarizations and intensities of the illuminating light accordingly. This may for example comprise adjusting a polarization and/or an intensity of the light to change a direction and/or a magnitude of the force and/or of the torque and/or to generate a force instead of a torque or vice-versa.

The system 700 and the method 800 may also be generalized for performing movements with a nanodrone in three dimensions, e.g. as detailed below with reference to FIGS. 11*a*, 11*b* and 12. This may in particular comprise illuminating the nanodrone with polarized light at the resonance wavelengths of its nanoantennas along two counter-propagating directions, e.g. along the +Z and −Z directions of FIG. 7.

FIG. 9 depicts scanning electron micrographs (panels a-e) and optical micrographs (panel f) of nanodrones according to exemplary embodiments of the invention. Panel a shows a scanning electron micrograph of a center portion of a nanodrone with four F-type nanoantennas similar to the nanodrone 500B of FIG. 5*b* in top view (scale bar 200 nm). Panel b shows a scanning electron micrograph of a center portion of a nanodrone with two U-type nanoantennas similar to the nanodrone 500A of FIG. 5*a* in top view (scale bar 200 nm). Panel c shows a 40° tilt view of one of the nanoantennas of the nanodrone of panel a (scale bar 50 nm) and panel d shows a 40° tilt view of the entire nanodrone of panel a on an indium tin oxide (ITO) substrate (scale bar 200 nm). Panel e shows a top view of an array of nanodrones with either two or four nanoantennas similar to the nanodrones 500A and 500B, respectively, of FIGS. 5*a*, 5*b* on an ITO substrate (scale bar 1 μm). Panel f shows an optical microscope image of a plurality of nanodrones with either two or four nanoantennas released into a chamber filled with water (scale bar 2 μm). The inset in panel f depicts a microscope image of a human erythrocyte at the same scale for comparison.

A nanoantenna for the nanodrones according to the invention may for example be fabricated as follows: An antenna layer, in particular an electrically conductive layer, may be provided on a structuring substrate, wherein the electrically conductive layer may in particular be a monocrystalline metallic layer, e.g. a monocrystalline gold flake arranged on the structuring substrate. The structuring substrate may comprise one or more layers and may for example comprise or consist of glass. The structuring substrate may be coated, e.g. by a thin layer of indium tin oxide (ITO arranged on top of the glass. A bottom layer of a carrier substrate for the nanoantenna, which may e.g. be the substrate 202 of the nanodrone, may be provided on the structuring substrate, for example by spin coating, prior to providing the antenna layer thereon. The bottom layer of the carrier substrate may for example have a thickness between 20 nm and 200 nm, in some examples between 50 nm and 100 nm, e.g. 70 nm. The bottom layer of the carrier substrate may for example comprise or consist of hydrogen silsesquioxane (HSQ).

The antenna layer may be patterned to define the structures of one or more nanoantennas, e.g. the electrically conductive structures of one or more nanoantennas. The antenna layer may for example be patterned by ion beam milling, e.g. helium ion beam milling. Preferably, the antenna layer is patterned by only milling outlines of the nanoantenna structures, e.g. by forming a trench in the antenna layer around each of the structures, wherein the trench may for example have a width between 5 nm and 30 nm, in some examples between 10 nm and 20 nm. Subsequently, the remaining parts of the antenna layer that do not form any of the nanoantenna structures may be removed, e.g. by peeling off the respective parts of the antenna layer. This may reduce the patterning time substantially and may further improve the quality of the resulting structures, e.g. due to a reduced proximity effect and a reduced re-deposition of sputtered material.

In some embodiments, a top layer of the carrier substrate may be deposited on the nanoantenna structures and the bottom layer of the carrier substrate. The top layer may for example comprise or consist of the same material as the bottom layer, in particular HSQ. A thickness of the top layer may be larger than the thickness of the bottom layer, for example about two times as large, e.g. such that the top layer can be used as an etching mask for the bottom layer to define a shape of the carrier substrate.

The carrier substrate may be patterned to define a shape of the carrier substrate, which may e.g. be the shape of the substrate 202 of the nanodrone. The carrier substrate may for example be patterned by electron beam lithography and/or etching. In one example, the top layer of the carrier substrate is patterned first, e.g. by electron beam lithography, to form an etching mask for the bottom layer. Subsequently, the bottom layer of the carrier substrate may be patterned using the top layer as a mask, e.g. by a buffered oxide etch. In some examples, the buffered oxide etch may also reduce a thickness of the top layer, e.g. such that the thickness of the top and bottoms layers is substantially equal.

In some embodiments, a fine-patterning of the carrier substrate may be performed after patterning the bottom layer, e.g. by electron beam lithography. The fine-patterning may for example smooth edges of the carrier substrate. In some examples, a third carrier substrate layer may be deposited on the top layer prior to the fine-patterning, e.g. by spin coating, wherein the third carrier substrate layer may comprise or consist of the same material as the top and/or bottom layers, in particular HSQ. This may for example improve a flatness of the top surface of the carrier substrate.

To release the nanodrone, the coating of the structuring substrate may be etched, e.g. using an acid such as hydrochloric acid that selectively etches the coating of the structuring substrate but not the carrier substrate. The nanodrone may then be removed from the structuring substrate, e.g. for transfer to a chamber or a well such as the well 720. The nanodrone may for example be peeled off the structuring substrate using a polymer such as polyvinyl alcohol (PVA) polyvinylpyrrolidone (PVP) and/or polymethyl methacrylate (PMMA). For example, a droplet of a polymer solution, e.g. a polymer solution comprising polymethyl methacrylate (PMMA), may be placed on the nanodrone on the structuring substrate. After drying out, a polymer piece is formed above the nanodrone, which may be attached to the nanodrone and used as a handle for peeling the nanodrone off the structuring substrate. The polymer piece may be dissolved subsequently for releasing the nanodrone, e.g. into the liquid 722. In some examples, this may comprise placing a droplet of another polymer solution, e.g. a polymer solution comprising a water-soluble polymer such as PVA, on the polymer piece, in particular on the surface of the polymer piece to which the nanodrone is attached. Thereby, a second polymer handle for the nanodrone may be formed. The PMMA polymer piece may then be dissolved, e.g. using acetone, and the second polymer handle may be used to transfer the nanodrone into the liquid 722, which may dissolve the second polymer handle, thereby releasing the nanodrone into the liquid 722.

FIG. 10 shows experimental data demonstrating independent control over the motional degrees of freedom of a nanodrone in two dimensions in accordance with an exemplary embodiment of the invention. The nanodrone comprises four F-type nanoantennas similar to the nanodrone 500B of FIG. 5*b* and may be controlled using the illumination schemes shown in the bottom row of FIG. 6. Pairs of adjacent nanoantennas share a common resonance wavelength, wherein the first and third nanoantennas 300B-1, 300B-3 have a resonant wavelength of about 830 nm and the second and fourth nanoantennas 300B-2, 300B-4 have a resonance wavelength of about 980 nm (cf. FIG. 5*b*). The scale bar is 2 μm and is the same for all panels.

Panels a and b contain sequences of images taken while rotating the nanodrone in clockwise and counter-clockwise direction, respectively. For this, the nanodrone is illuminated with circularly polarized light of the same polarization at both resonance wavelengths, wherein the direction of the rotation can be reversed by inverting the polarization, i.e. by using left-instead of right-circularly polarized light at both resonance wavelengths and vice-versa.

Panel c shows traces of the nanodrone during linear movements in directions that are substantially parallel and substantially anti-parallel to the Y axis. For this, the nanodrone is illuminated by light at only one of the resonance wavelengths, wherein the light has both left- and right-circularly polarized components and may e.g. be linearly polarized. A direction of motion of the nanodrone may be reversed by switching between the resonance wavelengths, i.e. from the resonance wavelength of the first nanoantenna 300B-1 to the resonance wavelength of the second nanoantenna 300B-2 and vice-versa.

Panel d shows a trace of the nanodrone being moved along an 8-shaped path by applying both a force and a torque to the nanodrone by an appropriate choice of the polarizations and intensities of the illuminating light.

FIGS. 11*a* and 11*b* show schematic illustrations of a pitch/roll nanoantenna 1100 according to an exemplary embodiment of the invention in top and side view, respectively. The pitch/roll nanoantenna 1100 may for example be employed in a nanodrone such as the nanodrone 1200 of FIG. 12 to achieve control over all six motional degrees of freedom in three dimensions.

The nanoantenna 1100 comprises two pairs of coupled resonators, which are arranged in different planes in the substrate 202 of a nanodrone. A first pair of coupled resonators is formed by a first central resonator 1102 and a first distal resonator 1104, which are arranged in a first plane in the substrate 202 that is substantially perpendicular to the Z axis of FIG. 11*b*. The resonators 1102, 1104 are arranged at an angle to each other in a V- or L-shaped configuration and may in particular be substantially perpendicular to each other. The resonators 1102, 1104 may for example be similar to the first and second resonators 302-1, 302-1 of the nanoantennas 300A, 300B of FIGS. 3*a*, 3*b*. A second pair of coupled resonators is formed by a second central resonator 1106 and a second distal resonator 1108, which are arranged in a second plane in the substrate 202 above the first plane. The resonators 1106, 1108 are also arranged at an angle to each other in a V- or L-shaped configuration and may in particular be substantially perpendicular to each other. The resonators 1106, 1108 may also be similar to the first and second resonators 302-1, 302-1 of the nanoantennas 300A, 300B. Each of the resonators 1102 to 1108 may have substantially the same resonance wavelength in some embodiments.

The central resonators 1102, 1106 are arranged such that the central resonators 1102, 1106 are substantially parallel to each other. In some embodiments, for example as shown in FIG. 11*a*, the central resonators 1102, 1106 may overlap with each other, e.g. such that the first central resonator 1102 completely covers the second central resonator 1106 when viewed along the Z direction and vice-versa. In other embodiments, the central resonators 1102, 1106 may be displaced with respect to each other in the XY plane and may not overlap with each other. A distance between the central resonators 1102, 1106 may e.g. be between 50 nm and 1 μm, preferably between 50 nm and 500 nm. In some embodiments, the distance between the central resonators 1102, 1106 may be chosen such that modes of the resonators 1102, 1106 are not coupled by evanescent fields.

Light emitted by one of the central resonators 1102, 1106 may be absorbed and reemitted by the other central resonator at least in part, wherein the resonance wavelengths of the resonators 1102, 1106, the common resonance wavelength of the first pair of resonators 1102, 1104, the common resonance wavelength of the second pair of resonators 1106, 1108 and/or the distance between the resonators 1102, 1106 may be chosen such the light interferes constructively in a direction collinear with the Z axis and destructively in the opposite direction. Thereby, asymmetric scattering along the Z direction may be achieved. In other embodiments, the resonance wavelengths of the resonators 1102, 1106 and the distance between the resonators 1102, 1106 may be chosen such that the scattering along the Z direction is symmetric, e.g. if the distal resonators 1104, 1108 exhibit an asymmetric scattering pattern.

The distal resonators 1104, 1108 are arranged adjacent to opposite ends of the central resonators 1102, 1106 and extend substantially perpendicular to the central resonators 1102, 1106 in opposite directions, e.g. such that the resonators 1102 to 1108 form a step-like structure in top view as illustrated in FIG. 11*a*. Corners of the distal resonators 1104, 1108 face diagonally opposite corners of the central resonators 1102, 1106. The orientation of the first pair of resonators 1102, 1106 is rotated by 180° with respect to the orientation of the second pair of resonators 1104, 1108.

Modes that are predominantly localized on the central resonators 1102, 1106 or modes that are predominantly localized on the distal resonators 1104, 1108 may be excited by an appropriate choice of the circular polarization of the illuminating light incident along the normal direction. Modes that are predominantly localized on the distal resonators 1104, 1108 may scatter light in a substantially symmetric fashion, whereas modes that are predominantly localized on the central resonators 1102, 1106 may scatter light asymmetrically, e.g. such that the mean wavevector of the scattered photons has a non-zero component along the normal direction. This may generate a force on the nanoantenna 110 which either enhances or at least partially compensates the light pressure by the illuminating light incident along the normal direction. Thereby, the force on the nanoantenna along the normal direction becomes polarization dependent, which may be used for controlling additional motional degrees of freedom.

In some embodiments, the resonance wavelengths of the distal resonators 1104, 1108 and the distance between the distal resonators 1104, 1108 may be chosen such the scattered light interferes constructively in a direction collinear with the Z axis and destructively in the opposite direction to obtain an asymmetric scattering pattern, either in addition to or instead of an asymmetric scattering by the central resonators 1102, 1106. In some examples, the resonance wavelengths and the arrangement of the resonators 1102 to 1108 are chosen such that the mean wavevector of the scattered photons is substantially parallel to the normal direction when exciting modes that are predominantly localized on the distal resonators 1104, 1108 (e.g. to compensate the light pressure at least in part) and substantially anti-parallel to the normal direction when exciting modes that are predominantly localized on the central resonators 1102, 1106 (e.g. to enhance the light pressure at least in part) or vice-versa, i.e. the scattered light may generate a recoil in opposite directions for left- and right-circularly polarized light.

FIG. 12 depicts a schematic illustration of a nanodrone 1200 in accordance with an exemplary embodiment of the invention in top view. The nanodrone 1200 comprises a substrate 202 and four F-type nanoantennas 300B-1 to 300B-4 similar to the nanodrone 500B of FIG. 5*b*, which allow for independent control over the three motional degrees of freedom in the XY plane as illustrated in the bottom row of FIG. 6.

In addition, the nanodrone 1200 comprises a pair of roll nanoantennas 1100-1, 1100-2 and a pair of pitch nanoantennas 1100-3, 1100-4, each of which may be similar to the roll/pitch nanoantenna 1100 of FIGS. 11*a*, 11*b*. The roll nanoantennas 1100-1, 1100-2 are arranged along a pitch axis 1204 of the nanodrone 1200 that extends substantially perpendicular to the normal direction and to a roll axis 1202 of the nanodrone 1200. The pitch nanoantennas 1100-3, 1100-4 are arranged along the roll axis 1202, i.e. rotated by 90° with respect to the roll nanoantennas 1100-1, 1100-2. The roll nanoantennas 1100-1, 1100-2 as well as the pitch nanoantennas 1100-3, 1100-4 are mirror-symmetric with respect to each other, i.e. the first roll nanoantenna 1100-1 is a mirror-image of the second roll nanoantenna 1100-2 and the first pitch nanoantenna 1100-3 is a mirror image of the second pitch nanoantenna 1100-4. This may give rise to "mirrored" scattering responses of the nanoantennas of a given pair (i.e. the pair of roll nanoantennas or the pair of pitch nanoantennas) with respect to the polarization of the incident light. For example, the first roll nanoantenna 1100-1 may exhibit a similar scattering response for left-polarized (right-polarized) light as the second roll nanoantenna 1100-2 does for right-polarized (left-polarized) light. This may allow for selectively addressing one of the roll nanoantennas and one of the pitch nanoantennas (e.g. to generate a non-zero recoil by the scattered light) by choosing the polarization of the incident light accordingly.

The resonance wavelengths of the roll and pitch nanoantennas 1100-1 to 1100-4 may be chosen such that the roll nanoantennas 1100-1, 1100-2 have substantially the same resonance wavelength and that the pitch nanoantennas 1100-3, 1100-4 have substantially the same resonance wavelength, which may be different from the resonance wavelength of the roll nanoantennas 1100-1, 1100-2. In this way, the roll nanoantennas 1100-1, 1100-2 and the pitch nanoantennas 1100-3, 1100-4 may be addressed selectively by choosing the wavelength of the incident light accordingly. In combination with the polarization-dependent scattering, each of the nanoantennas 1100-1 to 1100-4 may be addressed by an appropriate choice of the polarization and the wavelength. In other embodiments, different wavelength and polarization characteristics of the nanoantennas 1100-1 to 1100-4 may be chosen that also allow for selectively addressing individual nanoantennas, e.g. as detailed above for the nanodrone 500B of FIG. 5*b*.

Preferably, the resonance wavelength of the roll nanoantennas 1100-1, 1100-2 is substantially equal to one of the resonance wavelength of the first and third nanoantennas 300B-1, 300B-3 or the resonance wavelength of the second and fourth nanoantennas 300B-2, 300B-4, whereas the resonance wavelength of the pitch nanoantennas 1100-3, 1100-4 is substantially equal to the other one of the resonance wavelength of the first and third nanoantennas 300B-1, 300B-3 or the resonance wavelength of the second and fourth nanoantennas 300B-2, 300B-4.

This may allow for controlling all motional degrees of freedom in 3D using two pairs of counter-propagating polarized beams, namely one pair of counter-propagating beams at each of the two resonance wavelengths. If the intensities of the counter-propagating beams are balanced, the pitch and roll nanoantennas may not generate a net force or torque, i.e. the force along the normal direction as well as the torque along the roll and pitch axes 1202, 1204 may be substantially zero. The nanodrone 1200 may then be moved in a plane as discussed above with reference to FIG. 6. By imbalancing the intensities of the pair of beams at the resonance wavelength of the roll nanoantennas 1100-1, 1100-2, a torque that is substantially parallel or substantially anti-parallel to the roll axis 1202 may be generated, e.g. to tilt the nanodrone 1200 around the roll axis 1202. The direction of the torque may be controlled by adjusting the polarizations of the beams at the resonance wavelength of the roll nanoantennas 1100-1, 1100-2, e.g. by illuminating the nanodrone 1200 with right-circularly polarized from below and left-circularly polarized light from above or vice-versa. By imbalancing the intensities of the pair of beams at the resonance wavelength of the pitch nanoantennas 1100-3, 1100-4, a torque that is substantially parallel or substantially anti-parallel to the pitch axis 1204 may be generated, e.g. to tilt the nanodrone around the pitch axis 1204. The direction of the torque may be controlled by adjusting the polarizations of the beams at the resonance wavelength of the pitch nanoantennas 1100-3, 1100-4, e.g. by illuminating the nanodrone 1200 with right-circularly polarized from below and left-circularly polarized light from above or vice-versa. Furthermore, by using linear polarization and imbalancing the intensities of one or both pairs of beams, a force that is substantially parallel or substantially anti-parallel to the normal direction may be generated, e.g. to move the nanodrone 1200 up and down.

The embodiments of the present invention disclosed herein only constitute specific examples for illustration purposes. The present invention can be implemented in various ways and with many modifications without altering the underlying basic properties. Therefore, the present invention is only defined by the claims as stated below.

LIST OF REFERENCE SIGNS

100—nanoantenna
100A—nanoantenna of the first type
100B—nanoantenna of the second type
$j_{in}$—polarization of incident light
$\bar{j}_{in}$—opposite circular polarization to $j_{in}$
$k_{in}$—wavevector of incident photons
$k_R$—mean wavevector of scattered photons for $j_{in}$=R
$k_L$—mean wavevector of scattered photons for $j_{in}$=L
200—nanodrone
100-1—first nanoantenna
100-2—second nanoantenna
202—substrate
204—center of mass
$k_{1,R}$—mean wavevector of photons scattered by first nanoantenna for $j_1$=R
$k_{1,L}$—mean wavevector of photons scattered by first nanoantenna for $j_1$=L
$k_{2,R}$—mean wavevector of photons scattered by second nanoantenna for $j_2$=R
$k_{2,L}$—mean wavevector of photons scattered by second nanoantenna for $j_2$=L
F—force
M—torque
300A—nanoantenna of the first type
300B—nanoantenna of the second type
302-1, 302-2, 302-3—resonators
304-1, 304-2, 304-3—resonator axes
l—resonator length
w—resonator width
d—distance between coupled resonators
$l_3$—length of third resonator 302-3
$w_3$—width of third resonator 302-3
$d_3$—distance between first resonator 302-1 and third resonator 302-3
500A, 500B—nanodrones
300A-1, 300B-1—first nanoantenna
300A-2, 300B-2—second nanoantenna
300B-3—third nanoantenna
300B-4—fourth nanoantenna
502—notch
700—system for operating a nanodrone
702—illumination system
704A, 704B—light sources
706A, 706B—wave plates

708A, 708B—lenses
710A, 710B—dichroic mirrors
712—wave plate
714—objective
716—photodetector
718—controller
720—well
720A—bottom surface
722—liquid
800—method of operating a nanodrone
802—step of obtaining a motion command
804—step of determining an orientation of the nanodrone
806—step of determining polarizations and intensities for illuminating the nanodrone
808—step of illuminating the nanodrone
1100—pitch/roll nanoantenna
1102—first central resonator
1104—first distal resonator
1106—second central resonator
1108—second distal resonator
1200—nanodrone
1100-1—first roll nanoantenna
1100-2—second roll nanoantenna
1100-3—first pitch nanoantenna
1100-4—second pitch nanoantenna
1202—roll axis
1204—pitch axis

The invention claimed is:

1. A nanodrone comprising:

a substrate extending perpendicular to a normal direction; and two or more nanoantennas arranged one or both of on the substrate and in the substrate, wherein each of the two or more nanoantennas exhibits an optically addressable resonance at a respective resonance wavelength, wherein the two or more nanoantennas comprise a first nanoantenna and a second nanoantenna, each being configured to scatter circularly polarized light at the respective resonance wavelength that is incident on the nanoantenna along the normal direction such that photons of the scattered light have a mean wavevector $\vec{k}_{i,L}$ and $\vec{k}_{i,R}$ in a plane perpendicular to the normal direction for left- and right-circularly polarized light, respectively, with i=1 for the first nanoantenna and i=2 for the second nanoantenna, wherein:

$\vec{k}_{i,j_i}$ with $j_i$=L or R is non-zero;

$\vec{k}_{i,\vec{j}_i}$ with $j_i$=L for $j_i$=R and $\vec{j}_i$=R for $j_i$=L is substantially zero or substantially anti-parallel to $\vec{k}_{i,j_i}$; and at least one of $\vec{k}_{1,L}$ and $\vec{k}_{1,R}$ is substantially parallel or substantially anti-parallel to one of $\vec{k}_{2,L}$ and $\vec{k}_{2,R}$.

2. The nanodrone of claim 1, wherein one or both of:

a product of a scattering cross-section $A_{sc,1}$ of the first nanoantenna at the resonance wavelength of the first nanoantenna and a magnitude of the at least one of $\vec{k}_{1L}$ and $\vec{k}_{1,R}$ that is substantially parallel or substantially anti-parallel to one of $\vec{k}_{2,L}$ and $\vec{k}_{2,R}$ is substantially equal to a product of a scattering cross-section $A_{sc,2}$ of the second nanoantenna at the resonance wavelength of the second nanoantenna and a magnitude of the respective one of $\vec{k}_{2,L}$ and $\vec{k}_{2,R}$; and $\vec{k}_{i,\bar{j}_i}$ is substantially anti-parallel and substantially equal in magnitude to $\vec{k}_{i,j_i}$ for one or both of the first nanoantenna and the second nanoantenna.

3. The nanodrone of claim 1, wherein $\vec{k}_{i,j_i}$ is substantially perpendicular to a connection vector $\vec{r}_{1,2}$ connecting a center of the first nanoantenna with a center of the second nanoantenna for each of the first and second nanoantennas.

4. The nanodrone of claim 1, wherein the center of the first nanoantenna and the center of the second nanoantenna are arranged symmetrically with respect to a center of the nanodrone.

5. The nanodrone of claim 1, wherein the resonance wavelengths of the first and second nanoantennas are different.

6. The nanodrone of claim 1, wherein $\vec{k}_{1,j}$ is one of both of:

substantially anti-parallel to $\vec{k}_{2,j}$ for j=L or j=R, and substantially parallel to $\vec{k}_{2,\vec{j}}$ for j=L or j=R with $\vec{j}$=R for j=L and $\vec{j}$=L for j=R.

7. The nanodrone of claim 1, wherein the two or more nanoantennas further comprise a third nanoantenna and a fourth nanoantenna, each being configured to scatter circularly polarized light at the respective resonance wavelength that is incident on the nanoantenna along the normal direction such that photons of the scattered light have a mean wavevector $\vec{k}_{i,L}$ and $\vec{k}_{i,R}$ in a plane perpendicular to the normal direction for left- and right-circularly polarized light, respectively, with i=3 for the third nanoantenna and i=4 for the fourth nanoantenna wherein:

$\vec{k}_{i,j_i}$ with j; =L or R is non-zero; and $\vec{k}_{i,\vec{j}_i}$ with $\vec{j}_i$=L for $j_i$=R and $\vec{j}_i$=R for $j_i$=L is substantially zero or substantially anti-parallel to $\vec{k}_{i,j_i}$, wherein the wavevectors $\vec{k}_{i,j_i}$ for the first to fourth nanoantennas are mutually substantially perpendicular or substantially anti-parallel to each other.

8. The nanodrone of claim 7, wherein:

$\vec{k}_{i,j}$ with j=L or R is non-zero and $\vec{k}_{i,\bar{j}}$ with $\bar{j}$=L for j=R and $\bar{j}$=R for j=L is substantially zero for each nanoantenna of a first pair of nanoantennas selected from the first, second, third, and fourth nanoantennas; and $\vec{k}_{i,\bar{j}}$ is non-zero and $\vec{k}_{i,j}$ is substantially zero for each nanoantenna of a second pair of nanoantennas consisting of the two nanoantennas of the first, second, third, and fourth nanoantennas that are not contained in the first pair of nanoantennas.

9. The nanodrone of claim 7, wherein:

the resonance wavelengths of a third pair of nanoantennas selected from the first, second, third, and fourth nanoantennas are equal;

the resonance wavelengths of a fourth pair of nanoantennas consisting of the two nanoantennas of the first, second, third, and fourth nanoantennas that are not contained in the third pair of nanoantennas are equal; and the resonance wavelengths of the third pair are different from each of the resonance wavelengths of the fourth pair.

10. The nanodrone of claim 1, wherein some or all of the two or more nanoantennas each comprise a pair of coupled resonators with the resonator axes of the resonators of the pair being tilted with respect to each other.

11. The nanodrone of claim 10, wherein some or all of the two or more nanoantennas further comprise a third resonator each, the third resonator being substantially parallel to a first resonator of the pair of coupled resonators of the respective nanoantenna.

12. The nanodrone of claim 1, wherein the arrangement of the two or more nanoantennas or of a subset thereof exhibits one both of a discrete rotational symmetry around the center of the nanodrone and a mirror symmetry with respect to one or more planes of symmetry extending through the center of the nanodrone, the one or more planes of symmetry being spanned by a normal vector parallel to the normal direction and a respective in-plane vector perpendicular to the normal direction.

13. The nanodrone of claim 1, wherein the two or more nanoantennas further comprise one or both of one or more roll nanoantennas and one or more pitch nanoantennas, wherein the one or more roll nanoantennas are arranged along a pitch axis of the nanodrone that is substantially perpendicular to the normal direction and the one or more pitch nanoantennas are arranged along a roll axis of the nanodrone that is substantially perpendicular to each of the normal direction and the pitch axis.

14. The nanodrone of claim 13, wherein some or all of the roll and pitch nanoantennas each comprise:

a first pair of coupled resonators with the resonator axes of the resonators being tilted with respect to each other; and a second pair of coupled resonators with the resonator axes of the resonators being tilted with respect to each other, wherein one or both resonators of the first pair of coupled resonators is/are substantially parallel to a respective resonator of the second pair of coupled resonators.

15. A method of operating a nanodrone wherein the nanodrone comprises a substrate extending perpendicular to a normal direction and two or more nanoantennas arranged one or both of on the substrate and in the substrate, wherein each of the two or more nanoantennas exhibits an optically addressable resonance at a respective resonance wavelength, wherein the two or more nanoantennas comprise a first nanoantenna and a second nanoantenna, each being configured to scatter circularly polarized light at the respective resonance wavelength that is incident on the nanoantenna along the normal direction such that photons of the scattered light have a mean wavevector $\vec{k}_{i,L}$ and $\vec{k}_{i,R}$ in a plane perpendicular to the normal direction for left- and right-circularly polarized light, respectively, with i=1 for the first nanoantenna and i=2 for the second nanoantenna wherein, $\vec{k}_{i,j_i}$ with $j_i$=L or R is non-zero;

$\vec{k}_{i,j_i}$ with $\vec{j}_i$=L for $j_i$=R and $\vec{j}_i$=R for $j_i$=L is substantially zero or substantially anti-parallel to $\vec{k}_{i,j_i}$l; and at least one of $\vec{k}_{i,L}$ and $\vec{k}_{1,R}$ is substantially parallel or substantially anti-parallel to one of $\vec{k}_{2,L}$ and $\vec{k}_{2,R}$, the method comprising:

illuminating the nanodrone substantially along the normal direction with polarized light at the resonance wavelength of the first nanoantenna and polarized light at the resonance wavelength of the second nanoantenna, wherein the polarization of the light at the resonance wavelength of the first nanoantenna and the polarization of the light at the resonance wavelength of the second nanoantenna are chosen such that the linear momenta transferred to the nanodrone by light scattered by the first and second nanoantennas generate one or both of a force acting on the nanodrone that is substantially perpendicular to the normal direction and a torque acting on the nanodrone that is substantially collinear with the normal direction.

16. The method of claim 15, wherein the resonance wavelengths of the first and second nanoantennas are different and intensities of the light at the resonance wavelengths of the first and second nanoantennas are chosen such that a force, but no net torque or a torque, but no net force is generated.

17. The method of claim 15, further comprising adjusting one or more of the polarization, the intensity and the wavelength of the light to do one or more of the following:

change a direction of one or both of the force and of the torque;

generate a force instead of a torque or vice-versa; and change a magnitude of one or both of the force and the torque.

18. The method of claim 15, further comprising:

determining an orientation of the nanodrone in a plane that is substantially perpendicular to the normal direction; and adjusting one or more of the polarization, the intensity and the wavelength of the light based on the determined orientation of the nanodrone.

19. The method of claim 15, further comprising:

providing a bottom surface above which the nanodrone is to be operated, wherein the bottom surface extends perpendicular to the normal direction; and generating a repulsive force between the bottom surface and the nanodrone to counteract a light pressure generated by the illuminating light.

20. A system for operating a nanodrone, wherein the nanodrone comprises a substrate extending perpendicular to a normal direction and two or more nanoantennas arranged one or both of on the substrate and in the substrate, wherein each of the two or more nanoantennas exhibits an optically addressable resonance at a respective resonance wavelength, wherein the two or more nanoantennas comprise a first nanoantennas and a second nanoantenna each being configured to scatter circularly polarized light at the respective resonance wavelength that is incident on the nanoantenna along the normal direction such that photons of the scattered light have a mean wavevector $\vec{k}_{i,L}$ and $\vec{k}_{i,R}$ in a plane perpendicular to the normal direction for left- and right-circularly polarized light, respectively, with i=1 for the first nanoantenna and i=2 for the second nanoantenna, wherein:

$\vec{k}_{i,j_i}$ with $j_i$=L or R is non-zero;

$\vec{k}_{i,j_i}$ with $\bar{j}_i$=L for $j_i$=R and $\bar{j}_i$=R for $j_i$=L is substantially zero or substantially anti-parallel to $\vec{k}_{i,j_i}$; and at least one of $\vec{k}_{i,L}$ and $\vec{k}_{1,R}$ is substantially parallel or substantially anti-parallel to one of $\vec{k}_{2,L}$ and $\vec{k}_{2,R}$, the system comprising:

an illumination system configured to generate polarized light at the resonance wavelength of the first nanoantenna and at the resonance wavelength of the second nanoantenna, wherein the illumination system is configured to adjust a polarization and an intensity of the light at the resonance wavelengths of the first and second nanoantennas;

an imaging system for imaging the nanodrone; and a controller for controlling the illumination system, wherein the controller is configured to:

obtain a motion command that specifies a movement that is to be performed with the nanodrone;

determine an orientation of the nanodrone from an image obtained from the imaging system;

determine polarizations and intensities for the light generated by the illumination system at the resonance wavelengths of the first and second nanoantennas based on the motion command and the determined orientation; and illuminate, using the illumination system, the nanodrone with light at the resonance wavelengths of the first and second nanoantennas with the determined polarizations and intensities to perform the movement specified by the motion command.

* * * * *